Dec. 1, 1959 W. L. KUMLER ET AL 2,915,319
CAMERA DOLLY WITH DIFFERENTIAL STEERING MECHANISM
Filed April 5, 1957 8 Sheets-Sheet 1

WILLIAM L. KUMLER
STANLEY B. KUMLER
INVENTORS

BY
ATTORNEY

WILLIAM L. KUMLER
STANLEY B. KUMLER
INVENTORS

BY
ATTORNEY

Dec. 1, 1959   W. L. KUMLER ET AL   2,915,319
CAMERA DOLLY WITH DIFFERENTIAL STEERING MECHANISM
Filed April 5, 1957   8 Sheets-Sheet 3

WILLIAM L. KUMLER
STANLEY B. KUMLER
INVENTORS

BY
ATTORNEY

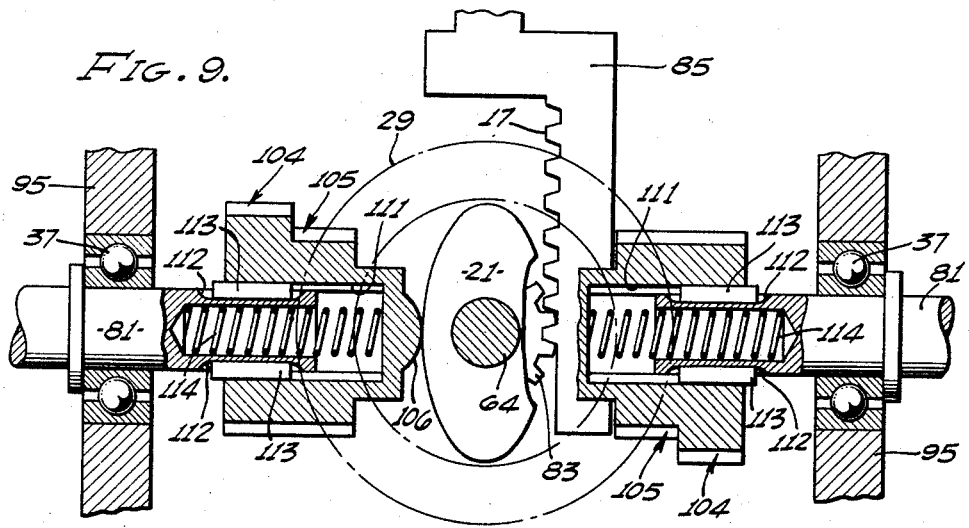
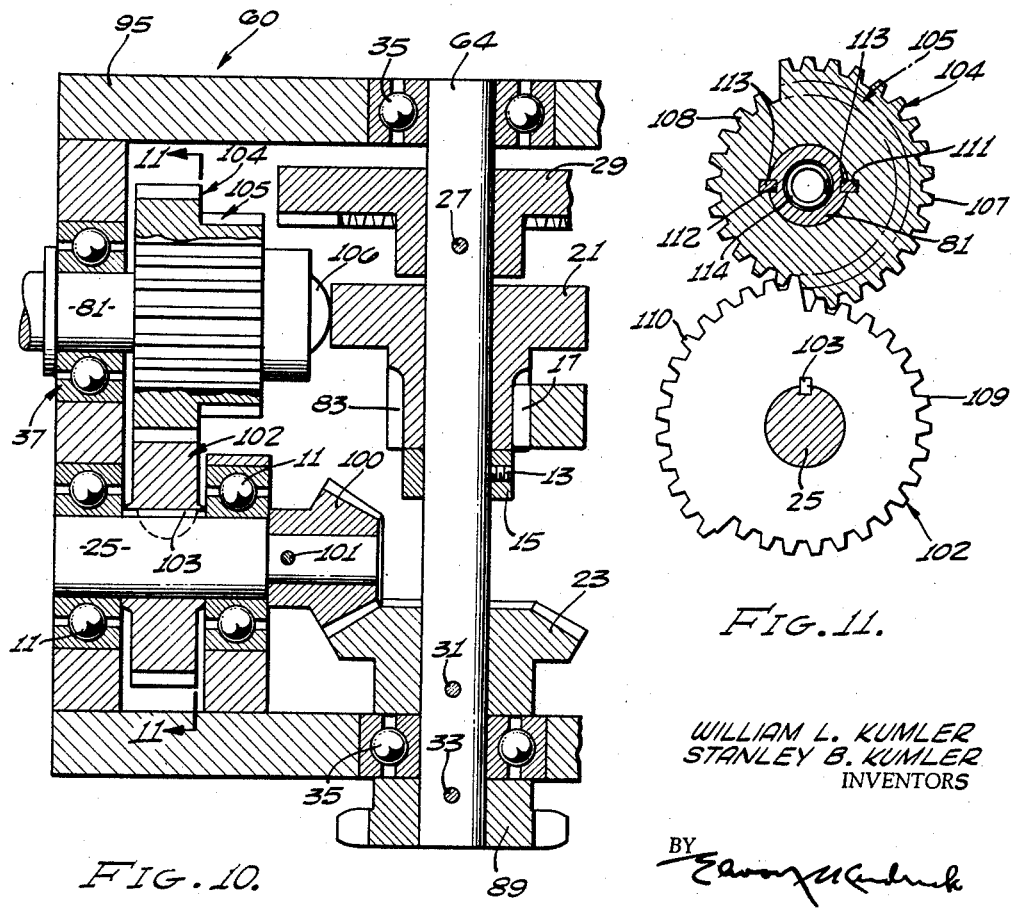

WILLIAM L. KUMLER
STANLEY B. KUMLER
INVENTORS

BY
ATTORNEY

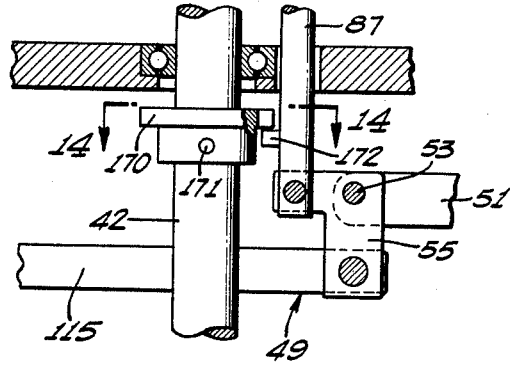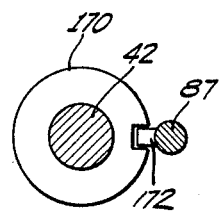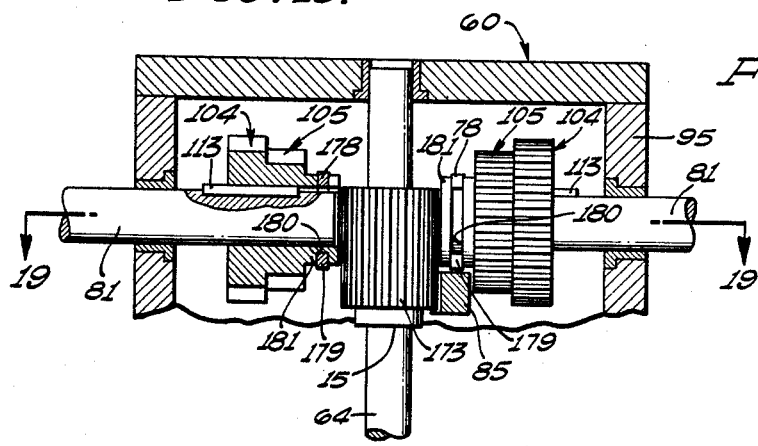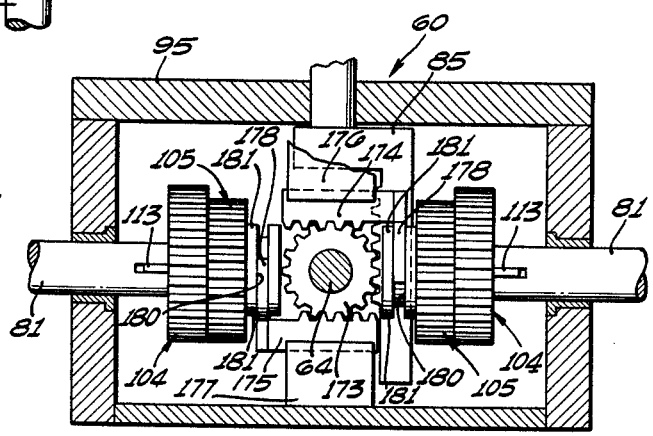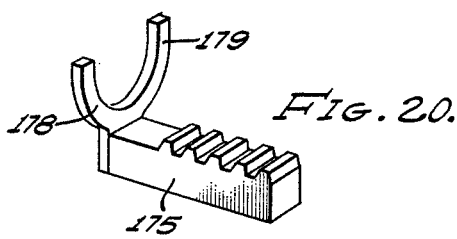

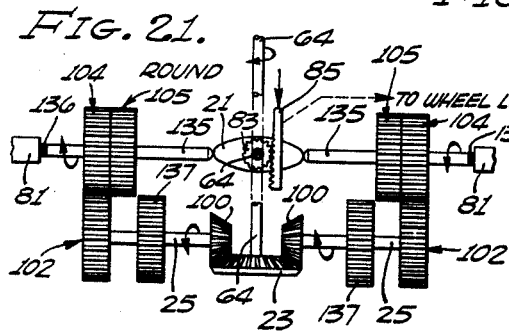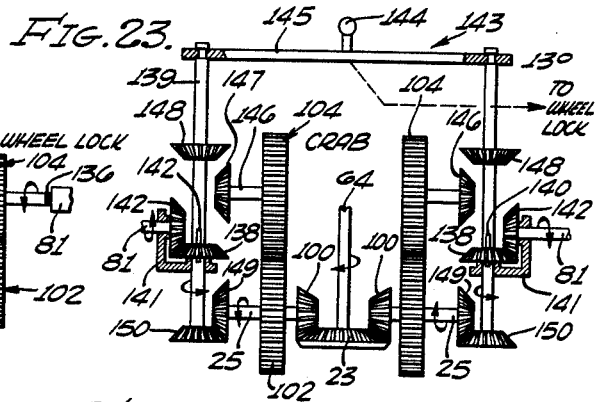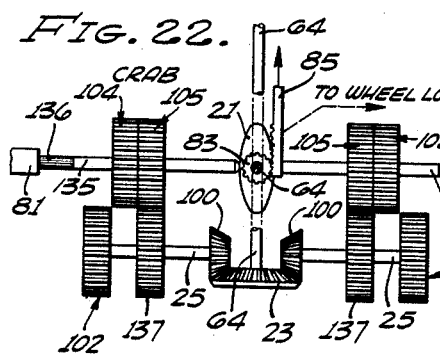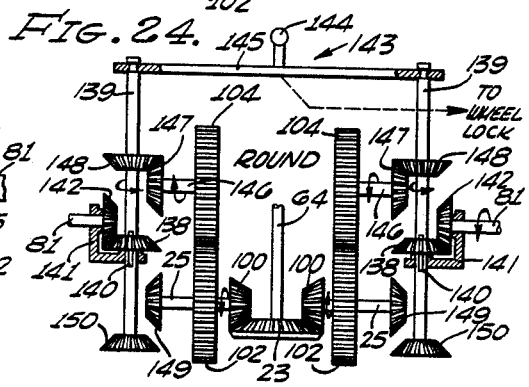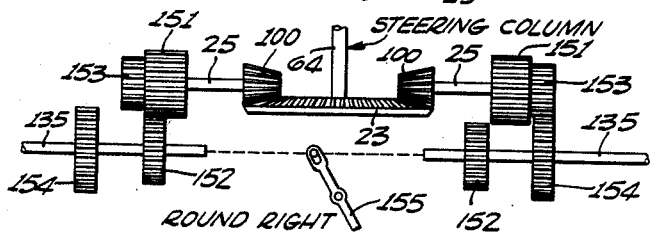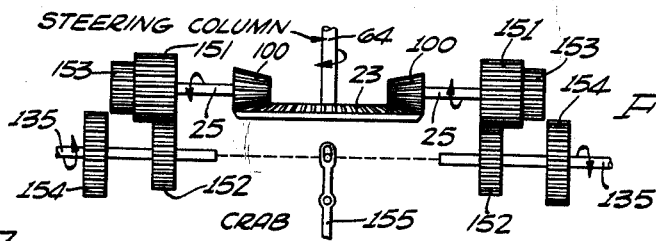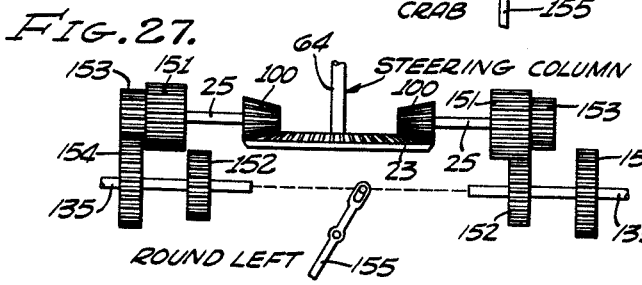

United States Patent Office 2,915,319
Patented Dec. 1, 1959

2,915,319

CAMERA DOLLY WITH DIFFERENTIAL STEERING MECHANISM

William L. Kumler, Los Angeles, and Stanley B. Kumler, Encino, Calif.

Application April 5, 1957, Serial No. 651,070

26 Claims. (Cl. 280—91)

This invention relates to devices for moving relatively heavy loads, and more particularly to a wheeled truck-like platform or dolly having a steering gear.

Although the invention will have a number of applications, it has been found especially useful in transporting television and motion picture type cameras in which rather complicated steering apparatus is required. Such limitations make the use of motors extremely difficult. As a matter of fact, for this reason such dollies are moved only manually.

Both television and motion picture cameras are extremely heavy. This means that dollies designed to support them must be strong and have a minimum amount of inherent frictional force impeding their movement over a floor so that they may be easily pushed manually.

Four double-wheeled, rubber tired motion picture camera dollies are generally used for the above-described purposes because they can be made very strong and are mechanically stable. All four double wheels of such dollies must also be steerable so that all wheels are parallel at any angle with respect to the position of a dolly framework from which they are suspended in a "crab" position and so that the dolly will turn about a single point in a "round" position. However, in the round position, it is necessary for the horizontal axis of each of the double wheels to pass through a single point to prevent unnecessary "primary" skid of the wheels. A secondary type of skid will, of course, always be present because of the finite tread width of the dolly tires. However, the primary type of skid must be eliminated or, at least, minimized so that the dolly may be pushed manually.

Types of dollies currently in commercial use are rather complicated in construction and employ long chains which make noise and induce a certain amount of "play" in their steering responses.

These problems are solved by the invention. It is adapted to be used especially with a steerable dolly including a framework, first and second pairs of wheel means to support the framework, each of the first pair of wheel means being rotatable about separate corresponding horizontal and vertical axes, and a steering member having a center position. All of the wheel means are maintained in a parallel position when the steering member is moved to its center position. Both the first and second pairs of wheel means are provided with common horizontal parallel axes maintained in parallel positions when the steering member is moved to the center position. The dolly is also provided with means for maintaining the second pair of wheel means in the parallel position while the first pair of wheel means are turned.

The present invention is adapted to be employed with the dolly described in accordance with the foregoing and includes a transmission for turning the first pair of wheel means about their respective vertical axes, the transmission including first and second output shafts to rotate the wheel means of the first pair, first and second auxiliary shafts, means to rotate both of the auxiliary shafts in response to movement of the steering member, first and second gears on the first and second output shafts, respectively, and third and fourth gears on the first and second auxiliary shafts, respectively, to mesh with the first and second gears. Each of the gears are provided with a non-uniform radius to cause angular movement, $\alpha$, of the first output shaft as a function of angular movement, $\beta$, of the second output shaft responsive to movement of the steering member approximately in accordance with the following relationship:

$$\alpha \cong \text{arc cot } (2 \tan 2\gamma + \cot \beta)$$

where $$\gamma = \frac{1}{2} \text{ arc tan } \frac{W}{4L} \text{ in degrees}$$

In this case, W is the distance between the first pair of wheel means, and L is the distance between the common horizontal axes of each of the pairs of wheel means when the steering member is in the center position.

This whole arrangement enables extreme simplification of the steering transmission. In the first place, maintaining the second pair of wheel means or wheels in a parallel fixed position corresponding to the center position of the steering member permits the total elimination of all steering connection from the steering transmission of these wheels when the transmission is shifted to the round position.

According to another feature of the invention the following are provided in combination: a framework, first and second pairs of vertical shafts rotatably mounted on the framework and positioned at four corners of a rectangle, first and second pairs of wheel means having axes extending horizontally through the vertical shafts respectively in the same horizontal plane, a steering member having a center position, all of the wheel means being parallel and the horizontal axes in each of the pairs being common when the steering member is moved to its center position, first and second pairs of horizontal transmission shafts rotatably mounted in end-to-end relation from the second pair of vertical shafts to the first pair of vertical shafts, respectively, lock means selectively operable to hold the second pair of transmission shafts in a fixed position relative either to the framework or to the first pair of transmission shafts, the second pair of wheel means having common horizontal axes when the second pair of transmission shafts are held in a fixed position relative to the framework, a steering transmission between the first pair of vertical shafts and having the steering member connected thereto, a third pair of transmission shafts extending from corresponding ones of the first pair of vertical shafts to the steering transmission, and gear means on the vertical shafts and on the ends of all of the transmission shafts adjacent the vertical shafts and the steering transmission to turn all of the shafts in response to movement of the steering member. Use of the lock means engaging the second pair of wheels permits use of the uncomplicated steering transmission of the present invention for both a crab and a round position and in addition makes the construction of all parts generally uncomplicated. Furthermore, the use of the lock means may, if desired, be made operative simultaneously with the gear shift of the steering transmission to simplify and speed the change over from the crab to the round position in the transmission. Also, by using gears continuously throughout the steering of the wheels, play and noise may be substantially eliminated.

Special lock means are employed in accordance with the present invention which may be manufactured most economically. Furthermore, the special lock means employed in accordance with the invention may be easily manipulated and may be conveniently made operative simultaneously with gear shift means of the steering transmission.

It is therefore an object of the invention to provide a dirigible dolly having an economical and uncomplicated steering gear.

It is another object of the invention to provide a dirigible dolly having substantially no play or noise inherent in the operation of the steering gear thereof.

These and other objects and advantages of the present invention will be better understood when considered with the following description taken in connection with the accompanying drawings made a part of this specification, wherein several embodiments are illustrated by way of example. The device of the present invention is by no means limited to the specific embodiments illustrated in the drawings since they are shown merely for purposes of description.

Fig. 9 is an enlarged broken sectional view of the steering transmission shown in and taken on the line 9—9 in Fig. 4;

Fig. 10 is an enlarged broken away sectional view of the steering transmission;

Fig. 11 is a sectional view of gears in the steering transmission shown in Fig. 10 taken on the line 11—11 shown therein;

Fig. 13 is an enlarged broken away sectional view of a gearshift safety device used in accordance with the preferred embodiment of the invention;

Fig. 14 is a sectional view taken on the line 14—14 shown in Fig. 13;

Fig. 18 is a vertical sectional view of a steering transmission used in an alternative embodiment of the invention;

Fig. 19 is a horizontal sectional view of the transmission taken on the line 19—19 shown in Fig. 18;

Fig. 20 is a perspective view of a rack and portion of gearshift means shown in Figs. 18 and 19;

Figs. 21 and 22 are schematic diagrams of alternative steering transmissions made in accordance with the invention shown in round and crab positions respectively;

Figs. 23 and 24 are diagrammatic views of still another embodiment of the invention with the transmission shown in round and crab positions, respectively;

Figs. 25, 26 and 27 are diagrammatic views of a still further embodiment of the invention shown in round right, crab and round left steering positions respectively.

Figure 28:
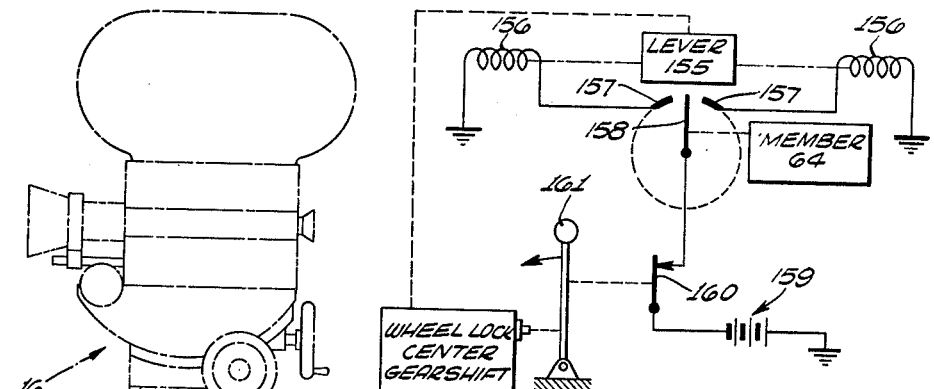
Fig. 28 is a schematic diagram of an electrical circuit which may be employed with the steering transmission shown in Figs. 25, 26 and 27.

In the drawings a dolly 10 is shown comprising a framework generally indicated at 18 including a top panel 20, a rear panel 22, parallel side panels 24 and 26, angular panels 28 and 30 and a front panel 32. A hollow cylindrical body 34 is then fixed to top panel 20 at plate 36 and a cap 38 is located on the top thereof through which a handlebar 40 is positioned to turn a hidden shaft inside of cylinder 34 indicated at 42 and best seen in Fig. 12. Handlebar 40 is fitted with handle grips 44 so that the dolly 10 may be steered appropriately by turning the handlebar 40 to the right or to the left to turn four or eight of the total of eight wheels on the dolly 10 as best shown in Fig. 3.

Figure 3:
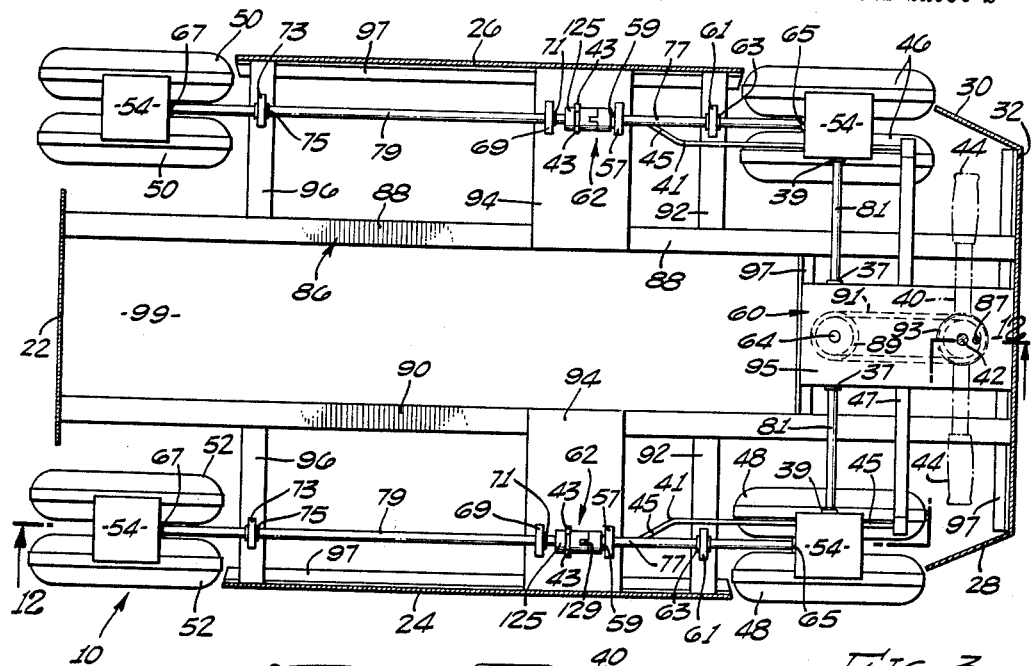
Fig. 3 is a horizontal sectional view of the dolly taken on the line 3—3 shown in Fig. 1.
Figure 12:
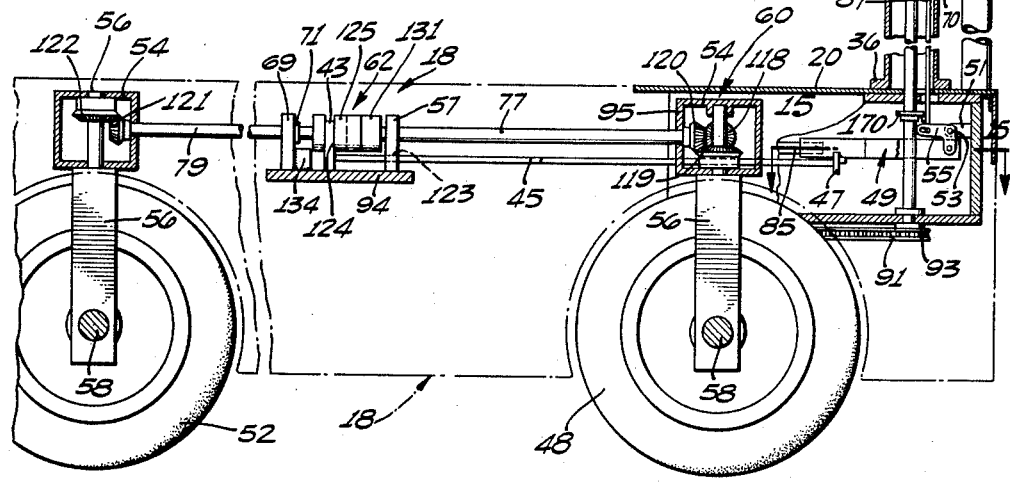
Fig. 12 is a longitudinal sectional view of the dolly taken on the line 12—12 shown in Fig. 3.

Eight wheels can be seen in Fig. 3. A first pair of wheel means 46 and 48 are provided at the right end of the dolly as viewed in Fig. 3, and a second pair of wheel means 50 and 52 are located at the left end of the dolly. All the wheel means 46, 48, 50 and 52 are rotatable about horizontal axes, but as stated previously, no motor power is provided on the dolly to rotate each pair of wheels thereshown about their horizontal axes because it is not practicable to do so in view of the complicated steering transmission which must be employed with the dolly. However, the wheels of the dolly are steerable, all four pairs being steerable when the transmission is shifted to a crab position and the two wheel means 46 and 48 being steerable when the steering transmission of the dolly is shifted to the round position. The manner in which all the wheels are supported from the dolly is best illustrated in Fig. 12. Each pair of wheels is provided with a gear box 54 which is preferably welded to the framework. A plurality of vertical shafts 56 are rotatably mounted through gear boxes 54. Axles 58 of the wheel means 46, 48, 50 and 52 are then rotatably mounted through vertical shafts 56. In the specific case at hand, each wheel of each pair is located on opposite sides of the vertical shafts 56.

Figure 4:
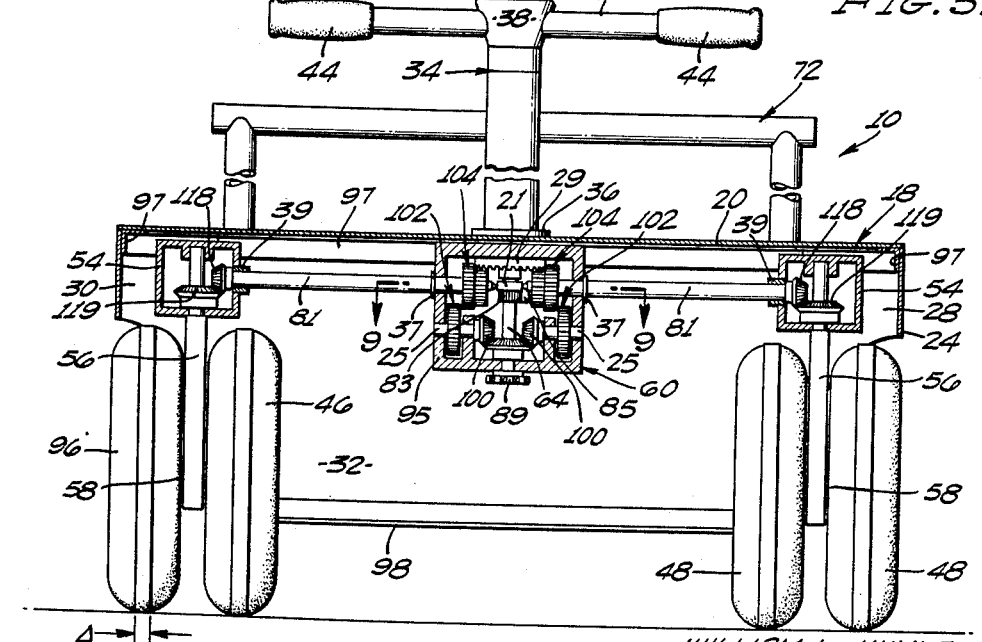
Fig. 4 is a vertical sectional view of the dolly through the steering transmission thereof taken on the line 4—4 shown in Fig. 1.
Figure 6:
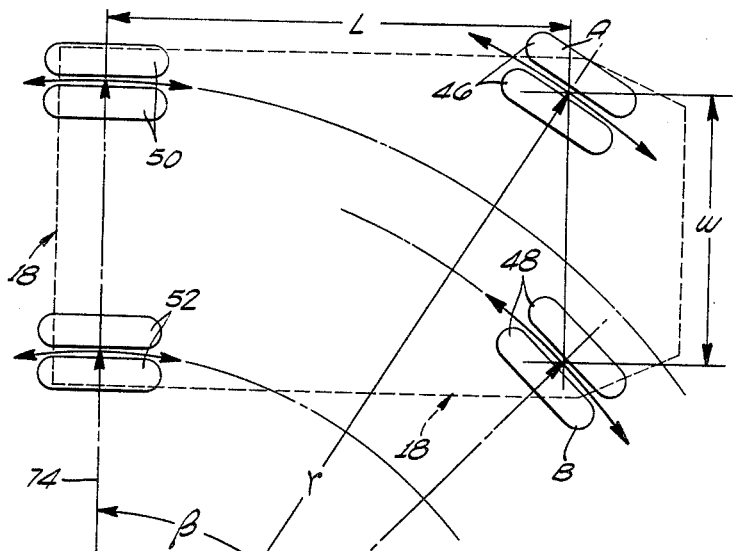
Figs. 5, 6 and 7 are diagrammatic plan views of the dolly with wheels shown in typical positions for movement of the dolly in crab or round positions.
Figure 7:
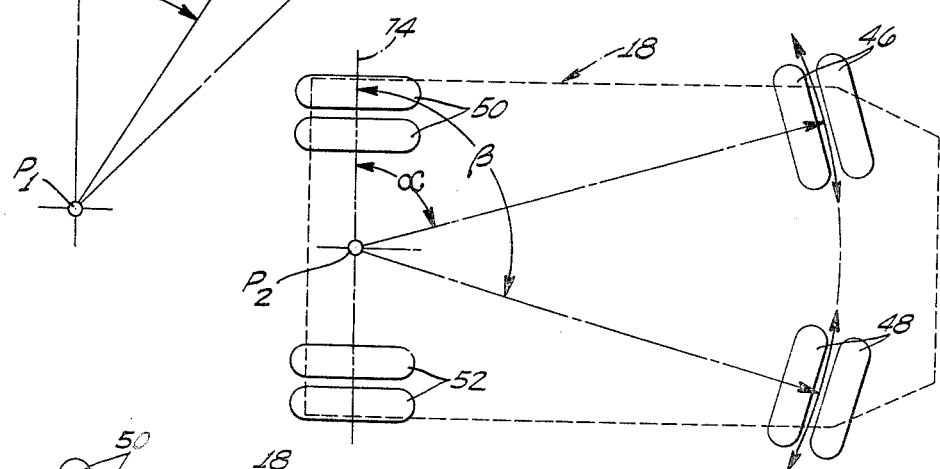
Figure 5:
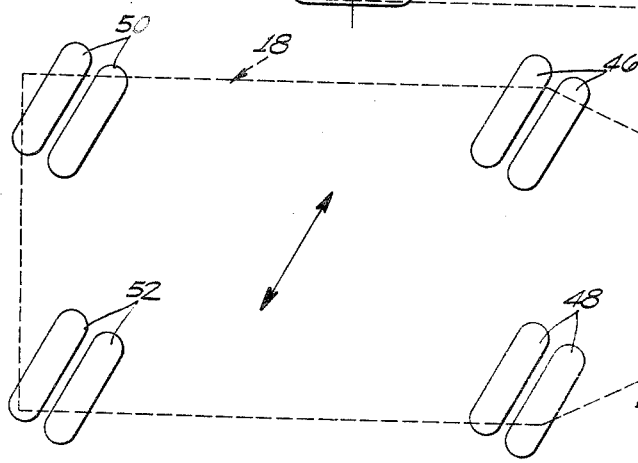

In the sectional view of the dolly 10 shown in Fig. 4, a steering transmission is indicated generally at 60. This transmission will be described in detail hereinafter; however, at this point it is desirable to explain the basis or theory on which the transmission 60 was constructed. Before going directly into the theory, it is to be noted that lock means 62 are also provided as shown in Fig. 3 to turn second pair of wheel means 50 and 52 simultaneously in a crab position when the lock means 62 are engaged and to hold the second pair of wheel means 50 and 52 in a substantially fixed position when the transmission 60 is shifted to a round position. Further, with the wheels in their respective positions as shown in Fig. 3, a steering member or shaft 64 shown in the transmission 60 in Fig. 4 may be described as being in its center position. As this is moved by turning handlebar 40, wheel means 46, 48, 50 and 52 will be rotated in a crab position as shown in Fig. 5. Shifting of the transmission 60 from this crab position to a round position is accomplished when the wheels are in the position shown in Fig. 3, i.e. the axes of wheel means 46 and 48 are common as are the axes of the wheel means 50 and 52, the axes of each of the first and second pairs of wheel means being parallel to each other. Shifting is actually accomplished by a gear shift and wheel lock lever 66 shown in Figs. 1 and 2, gear shifting and wheel locking being simultaneously accomplished by movement of this lever from one extreme lower position to an extreme higher position. It is to be noted that lever 66 is pivoted at a shaft 68 from a bracket 70 to a U-shaped push bar generally indicated at 72 in Figs. 1 and 2. In the crab position all wheel means 46, 48, 50 and 52 rotate about their vertical axes at the identical rate and in the same direction. However, in the round position, wheel means 50 and 52 are locked in place so that they have a common axes 74 as indicated in Figs. 6 and 7. In all three of the Figs.

5, 6 and 7, framework 18 is indicated only diagrammatically by a dotted line and the remainder of the dolly structure has been omitted for clarity.

In the round position, only wheel means 46 and 48 are turned. It is to be noted that to minimize primary skid, the horizontal axes of wheel means 46 and 48 must meet in a point, for example, such as the point $P_1$ shown in Fig. 6 or point $P_2$ as shown in Fig. 7. Should the wheel means have a zero thread width, no secondary skid would be induced at all and all the wheels would ride on concentric circles. It is to be noted that the horizontal axes of all the wheels 46, 48, 50 and 52 must intersect at point $P_1$ in Fig. 6, but that the axes of both wheels 50 and 52 will be common, i.e. the axis 74 must at least intersect one of the axes of wheels 46 and 48 at one point, all the axes of all the wheels being in a common horizontal plane. For this reason, a special steering transmission must be devised to perform this function.

As will be explained subsequently, nothing can be done about secondary skid since it must be accepted that the wheels of the dolly will have a finite tread width, for example, that illustrated as Δ in Fig. 4. However, by a few simple trigonometric relationships, it can be shown what the angle of the axis of wheel means 46 designated as α in Fig. 6 should be when the axis of wheel means 48 in Fig. 6 are disposed at an angle β and intersect at a point $P_1$ on axis 74, point $P_1$ being common to both the axes of wheels 46 and 48 and common axis 74 of wheels 50 and 52 shown in Fig. 6.

In order to develop appropriate trigonometric relation, some definitions must be made. In the first place, it is to be noted that all the wheel means 46, 48, 50 and 52 are provided with vertical axes through shafts 56 that intersect the horizontal plane at the corners of a rectangle having a width W and a length L. These dimensions are indicated in Fig. 6. By definition the distance from the vertical shaft of wheels 52 to the point $P_1$ is equal to $L \cot \beta$. The distance between the vertical axis of wheels 50 and the vertical axis of wheels 52 is of course equal to W. The distance from the vertical axis of wheels 50 to point $P_1$ may also be expressed by definition $L \cot \alpha$. This distance can also be expressed another way as the sum of W and $L \cot \beta$.

Hence $$L \cot \alpha = W + L \cot \beta \qquad (1)$$

or $$\alpha = \text{arc cot}\, (2 \tan 2\gamma + \cot \beta) \qquad (2)$$

where $$\gamma = \frac{1}{2} \text{arc tan}\, \frac{W}{2L}$$

The angle γ is used hereinafter to explain the ideal function α of Equation 2 in the graph shown in Fig. 8. It can easily be understood that as a function of β, secondary skid will be zero at β=0, and will increase as point $P_1$ approaches $P_2$ shown in Fig. 7, primary skid being a maximum when point $P_1$ reaches $P_2$. When point $P_1$ does reach point $P_2$ it can be shown that β=90+2γ where γ and β are in degrees.

Figure 8:
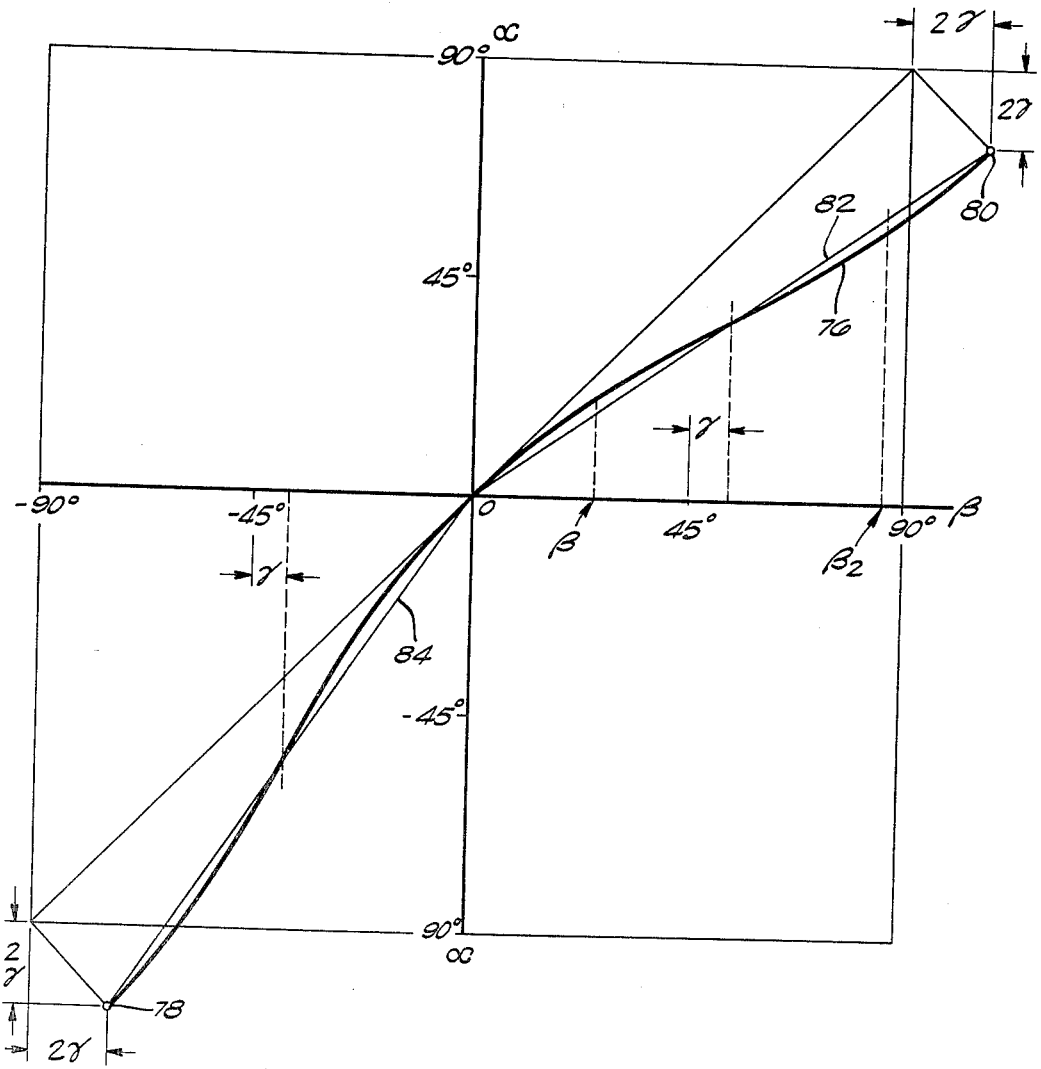
Fig. 8 is a graph of ideal and actual steering gear transmission characteristics which may be used with dollies of the steerable type.

The ideal function of α developed above is Equation 2 as indicated at 76 in Fig. 8. Several interesting features of this curve will best be explained by examination of the derivative of α with respect to β as follows:

$$\frac{d\gamma}{d\beta} = 1 + 2 \tan^2 2\gamma \left[1 - \frac{\sin 2(\alpha+\gamma)}{\sin 2\gamma}\right] \qquad (3)$$

Curve 76 has been plotted from the point $(-90+2\gamma, -90-2\gamma)$ to the point $(90+2\gamma, 90-2\gamma)$. It is to be noted that these points indicated at 78 and 80 in Fig. 8 lie on the lines $$\alpha = -\beta + 180 \text{ in degrees} \qquad (4)$$

and $$\alpha = -\beta - 180 \qquad (5)$$

The slope of the curve 76 at $\beta=-90+2\gamma$, $\beta=0$, and $\beta=90+2\gamma$ being equal to 1. It also will be noted that the curve 76 has an axis of symmetry of $$\alpha = -\beta \qquad (6)$$

The curve 76 flexes at $\beta=-45+\gamma$ and $\beta=+45+\gamma$. Straight lines 82 and 84 are drawn respectively from the origin of the graph to points 80 and 78. If the gear ratio for steering wheels 46 and 48 shown in Fig. 6, i.e. for turning them about their vertical axes, is equal to the slope of line 82, actual error of wheels 46 may be represented by the differences between curve 76 and line 82. In the conception of the invention the curve 76 was plotted and studied. It was noted that the straight line 82 very nearly approximates the curve 76 and that the actual error angle between them at maximum points indicated at $\beta_1$ and $\beta_2$ were of the order of three degrees. For this reason it was decided that a steering transmission with this gear ratio for turning wheels 46 in a left hand direction from center as viewed in Fig. 6 would be employed. The slope of line 82 was not actually used as the gear ratio but only an approximation of the slope of this line. The actual gear ratio used was 2:3. It is to be noted that this is .6667 which is very nearly equal to the slope of line 82, viz. .6907 for W=26 inches and L=44 inches, this being a good set of relative dimensions for a motion picture camera dolly. In this case γ=8.23°. This is in fact the value for which curve 76 has been plotted in Fig. 8 of the drawing.

As stated previously, it would be desirable to turn wheels 46 about their vertical axis at an angle equal to the ordinant value of curve 76 with a particular value for β shown in Fig. 8. However, it is to be noted that special cams or other devices to operate in the steering transmission 60 to turn the wheels 46 and 48 about their respective vertical axes at the appropriate angle not only are expensive but complicate the construction considerably and induce play into the steering response of the transmission. For this reason, it was decided to use a gear ratio G of a constant value to approximate the curve 76 wherever γ might be.

The question at this point is then in relation to the curve 76, what factor should go into determining what the slope G of a straight line should be in order to approximate the curve 76. In the first place, it should be noted that the slope of any line through the origin may be changed substantially without changing error $E_1$ at $\beta=\beta_1$ or $$E_1 = \text{arc cot}\, (2 \tan 2\gamma + \cot \beta_1) - G\beta_1 \qquad (7)$$

where $$E = \text{arc cot}\, (2 \tan 2\gamma + \cot \beta) - G\beta \qquad (8)$$

is the general equation for error E. It can be noted that the slope of line 82 may be decreased to such an extent that maximum error $E_2$ at $\beta=\beta_2$ is reduced to zero. For this reason, it may be desirable to find G by setting $E_2=E_p$, $E_p$ being error E at $\beta=90+2\gamma$. After solving for β gear ratio G may be computed as $$G = \frac{90 - 2\gamma + E_p}{90 + 2\gamma}$$

The gear ratio, G, should, of course, be less than $$\frac{90 - 2\gamma}{90 + 2\gamma}$$

or $$\frac{45 - \gamma}{45 + \gamma}$$

for the following reasons.

In the first place it is elementary that the tangential force perpendicular to and at horizontal radius of turn, r, which must be applied to overcome secondary friction due to rotation of a wheel of finite thickness $\Delta$ is given by the following relationship:

$$F_1 = .25\mu N\left(\frac{\Delta}{r}\right) \quad (9)$$

where $\mu$ is the coefficient of friction of the wheel treads and the surface over which they are rolled, N is the normal force on a wheel, $\Delta$ is the tread width of the wheel. It is to be noted that $F_1$ is not a function of the angular position of the wheel. Hence the total force for this specific case of the dolly 10 shown in Fig. 6, the total force required is:

$$F_s = (8)(\mu)\left(\frac{W}{8}\right)\left(\frac{\Delta}{4}\right)\left(\frac{1}{r}\right) \quad (10)$$

or $$F_s = .25\mu W\left(\frac{\Delta}{r}\right) \quad (11)$$

where W is the weight of the dolly 10 and $\Delta$ is the tread width as indicated in Fig. 4 of the drawings. In the development of Equation 10 it is to be noted that there are eight wheels, each supporting approximately $$\frac{W}{8}$$

of the weight W of the dolly 10. A good approximation for the distance $r$ is the distance from the point $P_1$ to the vertical axis of the wheels 46 as indicated in Fig. 6. A man pushing the dolly 10 will walk at least at an angle with respect to axis 74 equal approximately to $90-\alpha$ in degrees. This means that the distance from the force which he applies to the dolly 10 will be perpendicular to a radius approximately equal to the radius $r$ indicated in Fig. 6.

All that Equation 11 goes to prove is that the total secondary skid force required to overcome friction due to the finite tread width of all the wheels of the dolly 10 is inversely proportional to the radius $r$. The radius $r$ of course can be defined in terms of the independent variable $\beta$ of Equations 2 and 8 so that the total secondary skid force may be expressed as follows:

$$F_s = .25\mu W\left(\frac{\Delta}{L}\right)\frac{1}{\left[1+\left(\frac{W}{L}\right)+\cot\beta^2\right]^{1/2}} \quad (12)$$

By inspection, it is easy to see that the maximum value of $$F_s \text{ or } F_{s\ max.} \text{ at } \beta = -\text{arc cot}\frac{W}{L}$$

is as follows:

$$F_{s\ max.} = .25\mu W\left(\frac{\Delta}{L}\right) \quad (13)$$

It is to be noted that $F_s$ increases from zero to this maximum value as $\beta$ increases from zero to $$90 + \text{arc tan}\frac{L}{W}$$

Primary skid force, which can reasonably be assumed to be at only one pair of wheels, e.g. at wheel means 46, can be represented by the general formula $$F_p = \mu N \sin E\left(\frac{r_w}{r}\right) \quad (14)$$

where E is the same E represented in Equation 8 for the specific case of the dolly 10 shown in Fig. 6. N in this case per wheel is $$\left(\frac{W}{8}\right)$$

Hence, N in the case of Equation 14 is equal to (2)

$$\left(\frac{W}{8}\right)$$

The term $r_w$ is the distance of the wheel from its turning point, i.e. its turning radius. In the specific case of the dolly 10 shown in Fig. 6, $r_w = r$ as previously assumed in connection with the development of Equation 12. Thus, $$F_p = .25\mu W \sin E \quad (15)$$

The substitution of E in terms of $\beta$ of Equation 8 may be made in Equation 15 to obtain an expression of $F_p$ in terms of $\beta$, the independent variable used in connection with Equation 12. However, by inspection of the curve 76 of Fig. 8, it will be apparent that generally E will increase from $\beta=0$ to the first point at which the line 82 or a similar line crosses curve 76, the slope of the line, of course, being the gear ratio employed to approximate the curve 76. E will then decrease to a minimum value and return to zero at the point that a straight line through the origin again crosses the curve 76. $E_p$ will be negative or positive dependent on the radial direction of skid.

Assuming there is no slippage at the wheel means 48, 50 and 52 for the specific case shown in Fig. 6, it will be appreciated that regardless of the movement of the dolly 10, this force will be additive to the force required to overcome the frictional force $F_s$. Since $F_s$ in fact increases with $\beta$, as seen from the curve 76 in comparison with the line 82 in Fig. 8, it will generally be desirable to minimize $E_2$ or $E_{max.}$ at $\beta=\beta_2$. The slope of the line 82 is $$\frac{45-\gamma}{45+\gamma}$$

Hence it will generally be desirable to make the gear ratio G less than $$\frac{45-2\gamma}{45+2\gamma}$$

to minimize $E_2$ where $\beta$ is relatively large, this being the area in which $F_s$ increases. As stated previously, reducing the slope of the line 82 does not increase the maximum $E_1$ to any substantial degree since $\beta$ generally is substantially less than $\beta_2$. It has been stated too that perhaps the slope of line 82 should not be through the point 80 but should have a slope that makes $E_2 = \sin E_p$. It may even be desirable to make E less than the slope of this line in view of the fact that $F_s$ at $\beta = \sin 90 + 2\gamma$ is even greater than it is at $\beta = \sin \beta_2$. However, the value of this information is also somewhat reduced in view of the shape of the function $F_s$ of $\beta$ in Equation 12. Specifically for a ratio of $$\frac{W}{L} = .6$$

the normalized ratio $$\frac{F_s}{F_{s\ max.}}$$

is roughly equal to .2 at $\beta=22\frac{1}{2}°$, is equal to roughly .3 at 45°, .6 at $67\frac{1}{2}°$, .9 at 90° and 1.0 at $90+2\gamma$ or approximately 106.5°. Thus the fact that $F_s$ is rather large after $\beta=45°$ and does not increase a substantial amount particularly between $\beta=90°$ and $\beta=90+2\gamma$, reducing the $\mu$ ratio G below that which would produce in graphic form $E_3=E_p$ might be of some value but would not be of considerable value. However, the shape of the function $F_s(\beta)$ in Equation 12 still bears out the fact that substantial measures should be taken to minimize $E_2$ without paying as much regard to $E_1$ since $F_s$ is relatively large at $\beta=\beta_2$ and relatively small at $\beta=\beta_1$.

After arriving at a suitable design for $$G < \frac{45-\gamma}{45+\gamma}$$

another problem exists. Specifically, it is to be noted that the slope of line 82 is the reciprocal of the slope of line 84. This means that the gear ratio for the drive to wheels 46 and 48, respectively, must change from G to $$\frac{1}{G}$$

at $\beta=0$. This means that the gear ratio must be dependent and discontinuous with $\beta$ at $\beta=0$. That is, there must be a step function change in it. This problem too was solved in the conception of the invention in that the steering transmission 60 shown in Fig. 4, a detail of which is the use of gears having sectors of different but constant diameters as indicated in Fig. 11. Further alternative embodiments which will be explained in detail hereinafter, as will be the embodiments shown in Fig. 4, are shown in Figs. 16 through 23 inclusive. It will also be desirable in detail to describe the specific structure of the preferred lock means 62.

Figure 1:
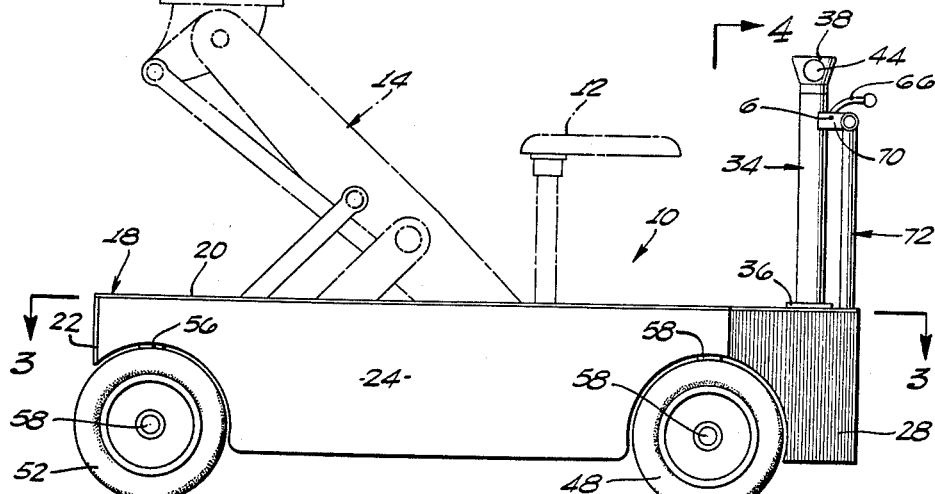
Fig. 1 is a side elevational view of the present invention with a motion picture camera shown mounted on it in phantom lines.
Figure 2:
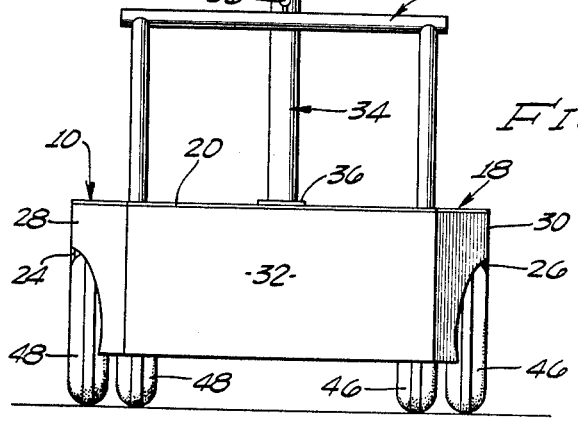
Fig. 2 is an end elevational view of the dolly.

Perhaps the general arrangement of parts of the dolly 10 are best illustrated in Figs. 3 and 4. The chassis of the dolly 10 indicated at 86 in Fig. 3 including upper and lower frameworks having vertical beams preferably connecting each of the extremities. Only one of these frameworks is shown in Fig. 3, this being a plan view. The chassis 86 accordingly includes longitudinal members 88 and 90 outwardly of which members 92, 94 and 96 project. Members 92, 94 and 96 are welded to the corresponding longitudinal members 88 and 90 and are fixed to the panels 24 and 26. Similarly, the ends of members 88 and 90 are fixed respectively to front and rear panels 32 and 22. The framework identical to the framework therein including members 88, 90, 92, 94 and 96 is also provided at the bottom of the dolly 10, for example, at the level of a lower angle iron fixed to front panel 32 in Fig. 4. The upper and lower frameworks, then, may be connected by vertical posts welded at each end to respective frameworks at the outward extremities of all the members 88, 90, 92, 94 and 96. Preferably, upper panel 20 covers the whole area of the dolly 10 as shown in Fig. 3 except the area of a bottom floor pan 99 which is fixed to the bottom framework of the dolly and is sunken below the floor panel 20 to permit mounting of the camera supporting apparatus 14 as indicated in Fig. 1. It is to be noted that all the corners of the meeting panels are provided with angle irons 97 for structural strength.

The manner in which steering is accomplished broadly when the transmission 60 is either shifted to the crab or round position is best illustrated in Fig. 12 where the steering means including shaft 42 is not only rotatably mounted through floor panel 20 but also through a housing 95 for transmission 60. It is to be noted that shaft 42 extends completely through the housing and has a sprocket 93 connected to its lower end over which chain 91 is looped to engage a sprocket 89 fixed to steering member 64 in transmission 60, as can be seen in Fig. 4.

As the section in Fig. 3 indicates, and as can also be seen in Fig. 12, wheel lock and gear shift lever 66 operates both rear lock means 62 and gear shift rack 85 operates with a pinion 83 to shift the gears of transmission 60.

Transmission 60 is provided with a pair of output transmission shafts 81 shown in Fig. 4 which are sometimes called a third pair of horizontally disposed shafts connected between vertical shafts 56 extending toward wheels 46 and 48. The output shafts 81 are accordingly rotatably mounted in transmission housing 95 and in gear boxes 54 located symmetrically above the wheels 46 and 48. The second pair of wheel means 50 and 52 are rotated when the steering transmission 60 is shifted to the crab position through a second pair of shafts 77 and a first pair of shafts 79, respectively, which are rotatably mounted on the chassis 86 in end to end relationship, wheel lock means 62 being provided to maintain the first pair of transmission shafts 79 in a substantially fixed position with respect to the second pair of shafts 77 when the steering transmission 60 is in fact shifted to the crab position. As stated previously, wheel lock means 62 are also provided to disengage the first pair of shafts 79 from second pair of shafts 77 and lock wheels 50 and 52 with shafts 77 and 79 in a fixed position relative to the chassis 86.

Horizontally disposed transmission shafts 79 are journaled in three bearings. One pair 67 are rotated respectively in the gear boxes 54 over wheels 50 and 52, respectively. A second pair of bearings 75 are located in bearing supports or ears 73 welded to frame members 96. A third pair of bearings 71 are located in ears 69 welded to frame members 94, respectively.

Second pair of shafts 77 similarly are provided with three bearings each, a pair of bearings 65 for the second pair of shafts 77 being located in gear boxes 54 over wheel means 46 and 48. A pair of bearings 63 are also located in ears 61 fixed to frame members 92 and a third set of bearings 59 located in a pair of ears 57 fixed to frame members 94. The third pair of transmission shafts or output shafts 81 are journaled in two pairs of bearings, respectively, 39 and 37, in gear boxes 54 over wheels 46 and 48 and in housing 95 of transmission 60.

Lock means 62 are operated simultaneously as transmission 60 is shifted from the crab to the round position. This is accomplished through movement of lever 66 upwardly and downwardly as indicated in Fig. 12. This causes the position of rod 87 to shift upwardly and downwardly and thereby rotate an L-shaped linkage 55 about an axis 53 on a bracket 51 fixed to the transmission housing 95. This moves a bar 49 which is so designed as to not interfere with the shaft 42 for steering. Bar 49 is provided with a cross member 47.

One end of rack 85 is connected to bar 49 and a pair of rods 45 are fixed to the cross bar 47. Rods 45 are then, in turn, connected to lock means 62 by means of pairs of U-shaped prongs 43 best illustrated in Fig. 3. It is to be noted that at 41, rods 45 are bent to prevent interference with ears 61 on frame members 92. The structure internally of transmission 60 shown in Fig. 4 is illustrated in greater detail in Figs. 9, 10 and 11.

The general arrangement of parts of the transmission 60 can be seen better in Fig. 10 wherein only one-half of the transmission is shown. In this case the steering member 64 is shown rotatably mounted in bearings 35 fixed to the top and bottom walls of transmission housing 95. Sprocket 89 is fixed to steering member 64 by means of a pin 33 and a bevel-gear 23 is also fixed to steering member 64 by means of a pin 31. Similarly at the top of the steering member 64 a crown gear 29 is fixed to steering member 64 by a pin 27. Between crown gear 29 and bevel-gear 23, a cam 21 is located fixed to a pinion 83 for engagement with teeth 17 of rack 85. Both cam 21 and gear 29 are maintained in a rotatable position about steering member 64 at a fixed axial position therein by means of a collar 15 having a set screw 13 to engage steering member 64. A pair of auxiliary shafts 25 are rotatably mounted in bearings 11 maintained in a fixed position relative to the transmission housing 95. As stated previously, the right hand portion of the transmission 60 not shown in Fig. 10 is arranged in an identical manner as the manner in which the structure on the left side of the steering member 64 shown in Fig. 10 is arranged. A pair of bevel-gears 100 are then pinned to the shaft 25 at 101 for engagement with the bevel-gear 23. A segmented gear 102 is then keyed to shaft 25 at 103 to be maintained in a fixed angular position and axial position relative thereto. A corresponding segmented gear 104 is then keyed with an unsegmented gear 105 to output shaft 81, unsegmented gear 105 having a rounded projection 106 thereon to engage the cam surface of cam 21.

In Fig. 10, gears 104 and 105 have been shifted to the extreme left hand and right hand positions adjacent side walls of housing 95 with segmented gears 102 and 104 in engagement, unsegmented gear 105 in this position not being in engagement with crown gear 29. In the round position, wheel means 46 and 48 are steerable although wheel means 50 and 52 are not. In order to change the axial positions of gears 104 and 105 as shown in Fig. 9 to the position shown in Fig. 10, it is necessary that cam 21 be turned by movement of lever 66 which causes gears 104 and 105 on opposite sides of cam 21 to move outwardly toward their extreme positions at the side walls of transmission housing 95. Movement of lever 66 causes rotation of cam 21 because cam 21 is fixed to pinion 83 which is meshed with teeth 17 of rack 85 fixed to lever 66. Movement of rack 85 in a transverse position caused by movement of lever 66 and the rotation of cam 21 causes gear 104 to mesh with gear 102. As stated previously, movement of lever 66 to cause meshing of gears 104 and 102 also causes a simultaneous disengagement of the second pair of transmission shafts 77 from the first pair of transmission shafts 79. Still further, the first pair of transmission shafts 70 with wheel means 50 and 52 are locked in a fixed position with respect to the frame 18. Wheel means 46 and 48 are then rotated by rotation of handle bar 40 through a sprocket 93, chain 91 and sprocket 93 turning steering member 64. Meshing of bevel-gears 23 and 100 then causes shaft 25 to turn in one direction or the other. As can be seen in Fig. 11, this will cause segmented gears 102 and 104 to mesh. In Fig. 11, it is to be noted that the gear ratios of segmented gears 102 and 104 at output shafts 81 to the angular movement of steering member 64 is different depending on the direction of rotation of handle bar 40 from its center position as indicated in Fig. 3. For $$\frac{W}{L} = \frac{26 \text{ in.}}{44 \text{ in.}}$$

it is convenient to make a sector 107 of gear 104 a 30-tooth gear with 14 teeth 1.875 P.D. It was found desirable to make a sector 108 of gear 104 a 24-tooth gear with 24 teeth, 1.500 P.D. Thus a sector 109 of gear 102 was made a 30-tooth gear with 18 teeth and 1.875 P.D. and the remaining sector 110 of gear 102 made a 36-tooth gear with 13 teeth and 2.25 P.D. All gears were made with a 16° pitch. It is to be noted that the view of Fig. 10 is the same only an enlarged sectional view of the transmission 60 shown in Fig. 4. For this reason, it is to be noted that in Fig. 4, both pairs of the segmented gears 102 and 104 on each side of the steering member 64 shown in Fig. 4 will be viewed as from the left in Fig. 11, i.e. sector 108 of both gears 104 and sector 110 of both gears 102 will be on the side of the view as shown in Fig. 4 for both pairs of wheel means 46 and 48 to rotate simultaneously in the same direction at appropriate relative rates.

From the description of the specific gears shown in Fig. 11, it will be apparent that the means relied upon to make the gear ratio G when the handle bar 40 is turned in one direction and to make it 1/G in the other is to make the gear ratio from steering member 64 to one of the output shafts 81 equal to 1 : 1 while the other is made 2 : 3. When the steering member 40 is turned to the right, the other one of said shafts 81 is then moved at a gear ratio with respect to the rate of steering member 64 of 1 : 1 while the said one shaft 81 is moved at a rate of 2 : 3. However, effectively, defining the gear ratio for one pair of wheels 46 with respect to the other 48, and maintaining this same definition for movement of handle bar 40 in one direction or the other, the gear ratio of the movement of shafts 56 will be G and 1/G and in the specific case of gears 102 and 104, 2 : 3 and 3 : 2, respectively.

It will be appreciated that in the crab position with wheel means 46, 48, 50 and 52 turning in a manner indicated in Fig. 5, it will be necessary to provide a 1 : 1 ratio for turning all the vertical shafts 56 of all the wheel means. This is done by locking first pair of shafts 79 in fixed positions relative to second pair of shafts 77 and releasing the lock on shafts 79 relative to framework 18. This is done by moving lever 66 from one of the extreme positions to the other. Rack 85 is moved in a transverse position as viewed in Fig. 9 to rotate cam to the position shown in that figure to cause crown gear 29 to engage unsegmented gears 105 and to cause segmented gears 104 to disengage segmented gears 102.

As shown in Fig. 9, gears 104 and 105 are maintained in fixed angular but movable axial positions on third pair of transmission shafts 81. This is accomplished through the use of an extended keyway 111 through the gears 104 and 105 and by the use of keyways 112 in shafts 81 of restricted length to contain keys 113. Both gears 104 and 105 at their contact points 106 with cam 21 are urged in the direction of the cam surface of cam 21 by means of coiled springs 114.

In Fig. 13, a disc 170 is shown pinned at 171 to shaft 42. Disc 170 cooperates with a projection 172 on rod 87 to prevent the shifting of gears in transmission 60 by movement of rod 87 vertically. It is to be noted that rod 87 need not move any substantial distance vertically and furthermore it is a linkage pivoted for movement via linkage 55 and the left arm of operating member 66. G may be expressed in another manner as the rate of rotation of wheel means 46 about its vertical axis with respect to that of wheel means 48 from, say, $\alpha = 0$ to $\alpha = 90 + 2\gamma \cdot 1/G$ will then describe the rate of movement of wheel means 46 with respect to wheel means 48 from $\alpha = 0$ to $\alpha = (90 - 2\gamma)$. For this reason, disc 170 effectively prevents shifting of gears in transmission 60 by movement of rod 87 unless shaft 42 and the steering member 64 are in the center positions with all the wheels parallel as shown in Fig. 3. The use of disc 170 on shaft 42 with projection 172 on rod 87 is also desirable to permit fast shifting of gears in transmission 60 simply by causing projection 172 to bear on disc 170 and turning shaft 42 until rod 87 will move vertically substantially perpendicular to the plane of disc 170.

Figure 15:
Fig. 15 is a sectional view of the dolly taken on the line 15—15 shown in Fig. 12.
Figure 17:
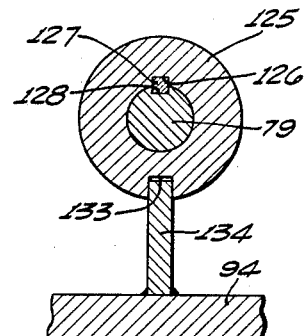
Fig. 17 is a transverse sectional view of the lock means taken on the line 17—17 shown in Fig. 16.

It will be apparent from comparison of Figs. 12 and 15 that interference with steering means of a shaft 42 is avoided by member 49 being divided into two pieces 115 as shown in Fig. 15 with a pin 116 projecting through the lower end of linkage 55 and the right ends of members 115. Members 115 are in turn pinned to rack 85 at 117.

It can be seen as viewed from the top, for example, as the section indicates in Fig. 3, when handle bar 40 is turned to the right, all wheel means 46, 48, 50 and 52 turn to the right. This is accomplished because of the sprocket arrangement of sprockets 93 and 89 and chain 91 with the respective relative positions of bevel-gears in gear boxes 54. The right hand gear box as viewed in Fig. 12 incorporates a bevel-gear 118 fixed to the end of a third or output shaft 81 which engages a bevel-gear 119 on a vertical shaft 56. In this manner, wheel means 48 is rotated about the vertical axis of a shaft 56. Still further, wheel means 52 is rotated about the corresponding axis of another shaft 56 by an arrangement of a bevel-gear 120 engaging bevel-gear 119 and fixed to one of the second pair of transmission shafts 77 which is in turn maintained in a substantially fixed position relative to one of the first pair of horizontally disposed transmission shafts 79 by locking means 62. The left end of transmission shaft 79 is then provided with a bevel-gear 121 to engage a bevel-gear 122 fixed to the upper end of a shaft 56 corresponding to wheel means 52. In particular, what is to be noted is that as shaft 42 turns to the right, as viewed in Fig. 3, steering member 64 will also turn to the right, left auxiliary shaft 25 as viewed in Figs. 4 and 10 will turn to the left as viewed from its right end, left output shaft 81 will turn to the left as viewed in Fig. 1 and as can be seen from Fig. 4, vertical shaft 50 located between wheel means 46 will turn to the right in the same direction as handle bar 40. Similarly, wheel means 46 will turn to the left when handle bar 40 is turned to the left. For similar reasons, also, wheel means 48 will turn to the right when handle bar 40 is turned to the right and turn to the left when handle bar 40 is turned to the left. However, because of the arrangement of bevel-gears 118, 119, and 120, it is necessary to locate bevel-gear 122 above the axis of first and second pairs of shafts 79 and 77 in order to cause wheel means 50 and 52 to turn to the right in the crab position when handle bar 40 is turned to the right and vice versa. That is, it is necessary to locate bevel-gear 122 above the axis of shafts 77 and 79 and bevel-gear 119 on the right hand vertical shaft 56 as viewed in Fig. 12 below the axis of transmission shafts 77 and 79 in order to cause all wheels to turn in the same direction. Bevel-gear 119, of course, could be located on top of gears 118 and 120 and bevel-gear 122 below bevel-gear 121 if a different means of steering transmission from shaft 42 could be provided so that steering member 64 would be rotated in a right hand position when handle bar 40 was turned in a left hand direction viewed from the top, e.g. as in Fig. 3.

Figure 16:
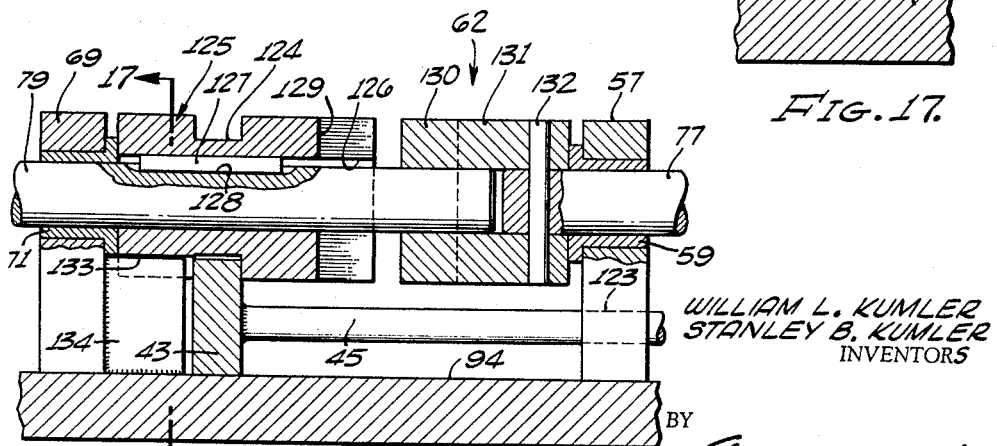
Fig. 16 is a vertical and longitudinal sectional view of wheel lock means for two sets of wheel means at one end of the dolly.

In the explanation of the specific structure of lock means 62 and the manner in which it operates, it is to be noted that rods 45 which are indirectly operated through movement of lever 66 project through holes 123 in ears of bearing supports 57 and are guided therethrough and fastened at the left ends, as viewed both in Figs. 12 and 16, to U-shaped member 43, which extends into a circumferential groove 124 in a cylindrical body 125 forming one hand of the lock means 62. The construction of U-shaped member 43 and groove 124 in cylindrical body 125 need not necessarily be used since the function of this structural configuration is to provide means by which cylindrical body 125 may be moved axially with respect to frame 18 or member 94 without impeding rotation of the body 125. It is to be noted that body 125 is mounted in fixed axial position on shaft 79 by means of a keyway 126 surrounding a key 127 also located in a keyway 128 in shaft 79. Keyway 126 is elongated, whereby body 125 may be axially moved along the shafts 79. It is in fact moved axially by movement of a corresponding rod 45. Body 125 is provided with a transverse slot 129 to receive a tongue part 130 of a second cylindrical body 131 which is maintained both in a fixed axial and fixed angular position with respect to shaft 77 by means of a pin 132. Lock means 62 in Fig. 16 is shown in position to lock wheel means 50 and 52. Wheel means 48 thus is free to move in response to movement of second pair of shafts 77 by having tongue 130 disposed within groove 129 as also indicated in Fig. 3. In Fig. 12 it is to be noted that in this position an additional keyway 133 provided in cylindrical body 125 misses and, therefore, does not engage a key 134 attached to bearing supports 69 and member 94 of framework 18. In Fig. 16 where tongue 130 of cylindrical body 131 is not in engagement in the slot 129 of cylindrical body 125, key 134 nevertheless is disposed in keyway 133 of cylindrical body 125. This means that shaft 77 is free to rotate with respect to shaft 79 and that shaft 79 is not free to rotate at all. This is the position, of course, in which wheel means 50 and 52 are locked in the positions in which they are shown in Fig. 3. The arrangement of keys 127 and 134 in keyways 128 and 133, respectively, is perhaps best illustrated in Fig. 17.

In Fig. 18, a preferred form of means to move segmented gears 104 and 105 axially on output shafts 81 is shown including rack 85 to engage a gear 173 that is maintained in a fixed axial position on steering member 64 but a rotatable angular position relative to steering member 64. This may be accomplished with the collar 15 also shown in Fig. 18. Gear 173 extends vertically on steering member 64 whereby it may be engaged by two other racks 174 and 175 guided in trackways 176 and 177, respectively, fixed to opposite side walls of transmission housing 95. Each of the racks 174 and 175 have upwardly extending semicircular projections 178 and 179, two of which are shown in Fig. 20. These projections fit in circumferential grooves 180 in annular extensions 181 of integrally formed gears 104 and 105.

Alternative embodiments of the invention are illustrated in Figs. 21 through 28 inclusive. In all Figs. 21 through 27, inclusive, steering member 64 is designated the same with a bevel-gear 23 fixed to its end to drive two auxiliary shafts 25 by means of bevel-gears 100 fixed to them respectively in a manner to be meshed with bevel-gear 23 on opposite sides of it. In addition, in all these figures, output shafts are indicated at 81. In Figs. 21 and 22, an alternative embodiment of the steering transmission of the invention is shown including identical gear shift means comprising the rack 85, pinion 83, and cam 21. Shafts 135 are moved axially but maintained in a fixed angular position with respect to output shafts 81 by being splined at 136. Preferably shafts 135 are urged toward the cam surface of cam 21 by spring means such as the springs 114 shown in Fig. 9 but not shown internally of output shafts 81 in Figs. 21 or 22. Otherwise, the transmission shown in Figs. 21 and 22 is substantially identical with the transmission 60 including segmented gears 102 and 104 identically positioned as explained in relation to Figs. 4, 10 and 11 and having unsegmented gear 105 located on the second pair of auxiliary shafts 135. However, unsegmented gears 137 are maintained both in a fixed axial and angular position with respect to the corresponding shafts 25 to mesh with gears 105 when rack 85 is shifted from the position shown in Fig. 21, which is the round position, to the position shown in Fig. 22, which is the crab position. In the round position, segmented gears 104 mesh with segmented gears 102 in exactly the same manner as shown in Fig. 11. The physical requirement of the system being that gears 102 and 137 should be spaced a sufficient distance apart to permit complete clearance of segmented gears 104 between the gears 102 and 137, respectively, when gears 105 and 137 mesh. It is to be noted that use of the transmission shown in Figs. 21 and 22 eliminates the necessity for crown gear 29 although the addition of two gears 137 must be made.

It is to be noted that corresponding segmented gears 102 and 104 and corresponding unsegmented gears 105 and 137 may be switched in position so that the unsegmented gears 105 and 137 are at left and right sides of the segmented gears 102 and 104, respectively.

Still another alternative embodiment of the steering transmission of the invention is shown in Figs. 23 and 24 where all gears shown in these figures are maintained in both fixed axial and fixed angular position with respect to the shafts on which they are mounted except for the fifth pair of bevel-gears 138 which are maintained in fixed angular positions with respect to third pair of auxiliary shafts 139 but which are maintained in movable axial positions with respect thereto by an elongated slot key means 140. It is to be noted that a bracket 141 which may be maintained in a fixed position relative to transmission housing also prevents downward movement of bevel-gears 138 as viewed in Fig. 6 and a pair of bevel-gears 142 are fixed to output shafts 81 and mesh with bevel-gears 138 to prevent their movement vertically upwardly on auxiliary shafts 139, respectively. According to this feature of the invention segmented gears 102 and 104 are always meshed and power transmission from one or the other simply selectively made by moving gear shift means 143 by handle 144 to move auxiliary shafts 139 upwardly or downwardly from one extreme position to the other, shafts 139 being maintained in fixed axial but rotatable angular positions relative to a supporting bar 145 connected to handle 144. Accordingly, segmented gears 102 are fixed to shaft 25 as before. Segmented gears 104 are respectively fixed to a second pair of auxiliary shafts 146 which are provided with bevel-gears 147 to engage bevel-gears 148 on the third pair of auxiliary shafts 139 when bar 145 is moved to its extreme lower position, not shown in Fig. 23 but shown only in Fig. 24. Fig. 23 illustrates the crab position, and Fig. 24 the round position.

In the round position, turning steering member 64 causes first pair of auxiliary shafts 25 to turn in opposite directions, second pair of auxiliary shafts 146 to turn in opposite directions, third pair of auxiliary shafts 139 to turn in the same direction, and third pair of transmission shafts 81 to turn in opposite directions due to the opposite position on bevel-gears 138. It is to be noted that depending upon the direction of rotation of steering member 64, the ratio of the rate of turn of one auxiliary shaft 146 with respect to another will be less or greater than unity, this being the case because an output is taken through segmented gears 102 and 104. In the crab position, output shafts 81 are geared to shafts 64 only through bevel-gears, these gears being bevel-gears from principal and main bevel-gears 23 fixed to shaft 64 to bevel-gears 100, a pair of bevel-gears 149 fixed to the outer ends of first pair of auxiliary shafts 25, and a pair of bevel-gears 150 to mesh with bevel-gears 149 fixed to the lower ends of third pair of auxiliary shafts 139. The shift of shafts 139 upwardly to cause bevel-gears 149 and 150 to mesh is shown in Fig. 18. This embodiment may be limited if an output gear ratio of 2:1 is not employed. Specifically, a 360 degree turn of supporting wheels will not be possible in crab if segmented gears 102 and 104 are always engaged.

The embodiment of the invention shown in Figs. 25 through 28, inclusive, illustrates the fact that a transmission may be devised which would not require the use of the segmented gears 102 and 104. In the preferred embodiment of the invention, segmented gears are used because they do not require shifting nearly as often. In particular, in Fig. 25, four pairs of gears are employed besides the bevel-gears 23 and 100. A first pair of gears 151 are provided specifically to engage a pair of gears 152 half the width of gears 151 in either of two axial positions of splined auxiliary shafts 135 which may ultimately be connected to output shafts 81. The gears 151 and 152 have a 1:1 ratio whereas another set of gears, only two of which are shown meshed in Fig. 27, have a 2:3 gear ratio, two pairs of such gears 153 and 154 being respectively fixed to auxiliary shafts 25. It is to be noted that splined shafts 135 are moved in a manner similar to the same splined shafts 135 shown in Figs. 16 and 17 relative to output shafts 81. For this reason, all gears shown in Figs. 25, 26 and 27 are fixed in both axial and circumferential positions on the respective shafts. A gear shift lever 155 is provided to shift the axial positions of shafts 135 simultaneously to the left or the right.

In the position shown in Fig. 25, the apparatus is in a position to rotate wheel means 46 and 48 at appropriate speeds when handle bar 40 is rotated to the right as viewed from the top. This will cause both wheel means 46 and 48 to rotate about their respective vertical axes with the gear ratio from steering member 64 to left auxiliary shaft 135 1:1 and right auxiliary shaft 2:3, the gear ratio between the right hand gear 153 and right hand gear 154 being 2:3. It is to be noted specifically that these gears are not segmented. Although a dotted line is shown connecting the shafts 135, it is to be understood that they must be maintained in rotatable angular positions with respect to each other because they will always turn in opposite directions as the steering column 64 is turned in either direction. When lever 155 is centered, the rate of turn of shafts 135 with respect to the other of the pair of auxiliary shafts 135 is 1:1 because the gear ratio between both gears 151 and 152 is 1:1 and they are both engaged on each side of steering member 64. In Fig. 27, the left hand gears 153 and 154 engage but the right hand gears engaged are 151 and 152. In this position, the transmission is shifted to turn wheel means 46 and 48 at appropriate speeds about their respective vertical axes when handle bar 40 is turned to the left and steering member 64 is consequently turned to the left.

Although a single lever 155 is shown for shifting the position of shafts 135, it is to be understood that the width of gear 151 need not be double the width of a gear 152 as specific means are provided to shift each of the auxiliary shafts 135 independently. Furthermore, the real requirement for the gears 154 and 152 on auxiliary shafts 135 is that they be spaced apart a distance sufficient to permit one to be engaged with a corresponding gear 153 and 151, respectively, on one of the first pair of auxiliary shafts 25. Thus the requirement for turning handle bar 40 to the right is different from that for turning it to the left. Specifically, the lever 155 must be in the position shown in Fig. 25 for handle bar 40 to be turned to the right and in the position shown in Fig. 27 for handle bar 40 to be turned to the left. Furthermore, in the crab position as distinguished from the round positions of Figs. 25 and 27, in Fig. 26, lever 155 must be centrally located as shown.

Due to the fact that lever 155 must be in an opposite position as handle bar 40 crosses its center position turning from left to right or vice versa, it will generally be inconvenient to shift the lever 155 each time the steering is performed in this manner. For this reason, it may be desirable to use solenoids indicated at 156 in Fig. 28 to shift lever 125 each time steering member 64 moves from its central position. For this reason, an electrical wiper may be fixed to steering member 64 or alternatively steering means or shaft 42 to contact two wiping contacts fixed in position relative to framework 18 or the transmission housing 95 as shown in Fig. 28 where the wiping contacts are indicated at 157. Each wiping contact 157 is designed to contact with the wiper indicated at 158 to complete a circuit through a particular one of solenoids 156 through a ground connection to a battery 159 and a gear shift switch 160. Solenoids 156 are designed to be of the single actuation type where energization of one solenoid will cause shafts 135 to move in one direction and energization of the other will cause the auxiliary shafts 135 to move in the other direction. In order to shift the transmission shown in Figs. 25 through 27 inclusive from the round to the crab position, it will not only be necessary to de-energize the circuits to the solenoids 155 as indicated by the switch 160 but a lever 161 should preferably be provided both to operate the wheel lock means 62 and to center the lever 155, e.g. mechanically, as shown in Fig. 26.

Thus it can be seen by the use of either the regularly formed bevel and unsegmented gears of the embodiment of the invention shown in Figs. 25, 26 or 27 or the segmented gears 102 and 104, use of a constant gear ratio nevertheless makes the construction of these embodiments relatively simple as compared to steering transmissions of the prior art for eliminating primary skid. These embodiments are, of course, made possible by the recognition of the nearly linear but reciprocal nature of a constant gear ratio to approximate the function α in the Equation 2 for β plus the ratio G when β is positive and the ratio $$\frac{1}{G}$$

when β is negative. In addition, by use of the wheel lock means 62, the round steering transmission to wheel means 50 and 52 is eliminated and operation of wheel lock means 62 is simplified simply by making it operative in response to movement of gear shift lever 66. In addition, a novel and economical wheel lock means 62 is also provided. In addition, use of gears from transmission 60 throughout the transmission to the vertical shafts 56 of all the wheel means 46, 48, 50 and 52 enable the construction of a motion picture camera dolly to support extremely heavy weights without inducing noise or play.

Although a few specific embodiments of the invention have been illustrated and described, it is to be understood that the invention is by no means limited to the specific structure of these embodiments since they are shown merely for purposes of illustration and not as a definition of the scope of the invention, the true scope of the invention being defined only in the appended claims.

What is claimed is:

1. A dirigible dolly comprising: a framework, first and second pairs of vertical shafts rotatably mounted on said framework positioned at four corners of a rectangle, first and second pairs of wheel means having axes extending horizontally through said vertical shafts respectively in the same horizontal plane, a steering member having a center position, all of said wheel means being parallel and the horizontal axes in each of said pairs being common when said steering member is moved to its center position, first and second pairs of horizontal transmission shafts rotatably mounted in end relation from said second pair of vertical shafts to said first pair of vertical shafts, respectively, lock means operable to hold said second pair of transmission shafts in a fixed position selectively relative either to said framework or to said first pair of transmission shafts, said second pair of wheel means having common horizontal axes when said second pair of transmission shafts are held in a fixed position relative to said framework, a steering transmission between said first pair of vertical shafts and having said steering member connected thereto, a third pair of transmission shafts extending from corresponding ones of said first pair of vertical shafts to said steering transmission, and gear means on said vertical shafts and on the ends of all of said transmission shafts adjacent said vertical shafts and said steering transmission to turn all of said shafts in response to movement of said steering member.

2. A dirigible dolly comprising: a framework, first and second pairs of wheel means to support said framework, each of said first pair of wheel means being rotatable about a separate corresponding horizontal and vertical axis, a steering member having a center position, a transmission responsive to movement of said steering member for turning said first pair of wheel means about their respective vertical axes, all of said wheel means being in a parallel position when said steering member is moved to its center position, both said first and second pairs of wheel means having common horizontal parallel axes when maintained in said parallel position, and means for maintaining said second pair of wheel means in said parallel position while said first pair of wheel means are turned, said transmission including means to rotate both said first pair of wheel means in one direction about their respective vertical axes simultaneously in response to movement of said steering member in a first direction, the rate of movement of one of said first pair of wheel means with respect to the other being a constant G less than unity when said steering member is moved in said first direction, said transmission also including means to rotate both said first pair of wheel means in a direction opposite said one direction in response to movement of said steering member in a second direction opposite said first direction, the rate of movement of said one of said first pair of wheel means with respect to said other of said first pair of wheel means being a constant equal to $$\frac{1}{G}$$

when said steering member is moved in said second direction, said transmission also including at least one pair of meshing segmented gears and means to move one of said segmented gears in response to movement of said steering member, each of said segmented gears including two sectors of different but uniform diameters to mesh with two corresponding sectors in the other gear; one of said pairs of segmented gears and an unsegmented gear positioned on and in a fixed rotatable but movable axial position relative to each output shaft, said unsegmented gears being positioned at the ends of said output shafts, gear shift means to maintain each pair of gears corresponding to each of said output shafts in a selected one of two fixed positions, crab steering gear means responsive to movement of said steering member having an unsegmented gear to mesh with both of said unsegmented gears of said output shafts for rotating said output shafts at the same rate through said unsegmented gears, round steering gear means responsive to movement of said steering member having a segmented gear to mesh with each of said segmented gears on said output shafts for rotating said output shafts at different rates, said output shafts being positioned in an end-to-end relation about a common axis, said steering member being a rotatable vertical shaft having an axis perpendicular to the common axis of said output shafts; a gear rotatably mounted on said steering member; a rack to rotate said gear; and means responsive to movement of said gear on said steering member to move said segmented gears on said output shaft in a spaced apart relation in one of two fixed axial positions.

3. The invention as defined in claim 2, wherein means are additionally provided to operate said rack.

4. The invention as defined in claim 3, wherein said transmission includes a pair of auxiliary shafts each having another of said segmented gears fixed on it to mesh with each of the segmented gears on each of said output shafts, said auxiliary shafts having mutually adjacent ends with bevel-gears fixed thereto, said steering member also extending between mutually adjacent ends of said auxiliary shafts and having a bevel-gear fixed thereto to mesh with both the bevel-gears on said auxiliary shaft.

5. A dirigible dolly comprising: a framework, first and second pairs of wheel means to support said framework, each of said first pair of wheel means being rotatable about a separate corresponding horizontal and vertical axis, a steering member having a center position, a transmission responsive to movement of said steering member for turning said first pair of wheel means about their respective vertical axes, all of said wheel means being in a parallel position when said steering member is moved to its center position, both said first and second pairs of wheel means having common horizontal parallel axes when maintained in said parallel position, and means for maintaining said second pair of wheel means in said parallel position while said first pair of wheel means are turned, said transmission including means to rotate both said first pair of wheel means in one direction about their respective vertical axes simultaneously in response to movement of said steering member in a first direction, the rate of movement of one of said first pair of wheel means with respect to the other being a constant G less than unity when said steering member is moved in said first direction, said transmission also including means to rotate both said first pair of wheel means in a direction opposite said one direction in response to movement of said steering member in a second direction opposite said first direction, the rate of movement of said one of said first pair of wheel means with respect to said other of said first pair of wheel means being a constant equal to $$\frac{1}{G}$$

when said steering member is moved in said second direction, said transmission also including at least one pair of meshing segmented gears and means to move one of said segmented gears in response to movement of said steering member, each of said segmented gears including two sectors of different but uniform diameters to mesh with two corresponding sectors in the other gear; one of said segmented gears and an unsegmented gear positioned on and in a fixed rotatable but movable axial position relative to each output shaft, said unsegmented gears being positioned at the ends of said output shafts, gear shift means to maintain each pair of gears corresponding to each of said output shafts in a selected one of two fixed positions, crab steering gear means responsive to movement of said steering member having an unsegmented gear to mesh with both of said unsegmented gears of said output shafts for rotating said output shafts at the same rate through said unsegmented gears, round steering gear means responsive to movement of said steering member having a segmented gear to mesh with each of said segmented gears on said output shafts for rotating said output shafts at different rates; and means rendering said gear shift means inoperative except when said steering member is in said center position.

6. The invention as defined in claim 5, wherein said means to render said gear shift inoperative includes the following: a disc-shaped member, means to move said disc-shaped member in response to movement of said steering member, said gear shift means including a shaft extending perpendicularly to the plane of said disc, a projection on said shaft to extend over said disc, said shaft being cut away at one circumferential portion to permit the passage of said projection through when said steering member is in said center position, whereby said gear shift means may be operated.

7. The invention as defined in claim 6, wherein said transmission includes a pair of auxiliary shafts each having another of said segmented gears fixed to it to mesh with each of the segmented gears on each of said output shafts, said auxiliary shafts having mutually adjacent ends with bevel-gears fixed thereto, said steering member also extending between mutually adjacent ends of said auxiliary shafts and having a bevel-gear fixed thereto to mesh with both the bevel-gears on said auxiliary shaft.

8. In a dirigible dolly including a framework, first and second pairs of wheel means to support said framework, each of said first pair of wheel means being rotatable about separate corresponding horizontal and vertical axes, a steering member having a center position, all of said wheel means being in a parallel position when said steering member is moved to a center position, both said first and second pairs of wheel means having common horizontal parallel axes maintained in said parallel positions when said steering member is moved to said center position, and means for maintaining said second pair of wheel means in said parallel position while said first pair of wheel means are turned, a transmission for turning said first pair of wheel means about their respective vertical axes, said transmission comprising: first and second output shafts to rotate the wheel means of said first pair, respectively; first and second auxiliary shafts; means to rotate both of said auxiliary shafts in response to movement of said steering member; first and second gears on said first and second output shafts, respectively; third and fourth gears on said first and second auxiliary shafts, respectively, to mesh with said first and second gears; each of said gears having a non-uniform radius to cause angular movement $\alpha$ of said first output shaft as a function of angular movement $\beta$ of said second output shaft responsive to movement of said steering member approximately in accordance with the following relationship:

$$\alpha \cong \text{arc cot } (2 \tan 2\gamma + \cot \beta)$$

where $$\gamma = \frac{1}{2} \text{ arc tan } \frac{W}{4L} \text{ in degrees}$$

and W is the distance between said first pair of wheel means and L is the distance between the common horizontal axes of each of said pairs of wheel means when said steering member is in said center position.

9. A dirigible dolly comprising: a framework, first and second pairs of wheel means to support said framework, each of said first pair of wheel means being rotatable about a separate corresponding horizontal and vertical axis, a steering member having a center position, and a transmission responsive to movement of said steering member for turning said first pair of wheel means about their respective vertical axes, all of said wheel means being in a parallel position when said steering member is moved to its center position, both said first and second pairs of wheel means having common horizontal parallel axes when maintained in said parallel position, and means for maintaining said second pair of wheel means in said parallel position while said first pair of wheel means are turned, said transmission including means to rotate both said first pair of wheel means in one direction about their respective vertical axes simultaneously in response to movement of said steering member in a first direction, the rate of movement of one of said first pair of wheel means with respect to the other being a constant G less than unity when said steering member is moved in said first direction, said transmission also including means to rotate both said first pair of wheel means in a direction opposite said one direction in response to movement of said steering member in a second direction opposite said first direction, the rate of movement of said one of said first pair of wheel means with respect to said other of said first pair of wheel means being a constant equal to $$\frac{1}{G}$$

when said steering member is moved in said second direction, said transmission including a pair of output shafts, a segmented gear and an unsegmented gear positioned on and in a fixed rotatable but movable axial position relative to each output shaft, said unsegmented gears being positioned at the ends of said output shafts, gear shift means to maintain each pair of gears corresponding to each of said output shafts in a selected one of two fixed positions, crab steering gear means responsive to movement of said steering member having an unsegmented gear to mesh with both of said unsegmented gears of said output shafts for rotating said output shafts at the same rate through said unsegmented gears, round steering gear means responsive to movement of said steering member having a segmented gear to mesh with each of said segmented gears on said output shafts for rotating said output shafts at different rates.

10. The invention as defined in claim 9, wherein said output shafts are positioned in an end-to-end relation about a common axis, wherein said steering member is a rotatable vertical shaft having an axis perpendicular to the common axis of said output shafts, wherein said gear shift means includes: means to urge said gears on said output shafts towards the mutually adjacent ends thereof, a cam rotatably mounted about the axis but maintained in an axially fixed position with respect to said steering member, said fixed axial position being at the position of the mutually adjacent ends of said output shafts, said cam being adapted to space the gears on the ends of said output shaft apart in one of two fixed axial positions when it is rotated to one of two circumferential positions about said steering member.

11. The invention as defined in claim 10, wherein said gear shift means also includes means to turn said cam to one of said two circumferential positions.

12. The invention as defined in claim 11, wherein said means to turn said cam includes a pinion fixed to said cam and a rack to engage said pinion.

13. The invention as defined in claim 12, wherein said cam is oval in shape to maintain the gears on said output shafts spaced apart a first distance when said cam is in a first position and a second distance when said cam is in a second position, said first distance being greater than said second distance.

14. The invention as defined in claim 13, wherein each segmented gear of said round steering gear means being fixed to an auxiliary shaft to mesh with each of the segmented gears on each of said output shafts, said auxiliary shafts having mutually adjacent ends with bevel-gears fixed thereto, said steering member also extending between mutually adjacent ends of said auxiliary shafts and having a bevel-gear fixed thereto to mesh with both the bevel-gears on said auxiliary shaft.

15. The invention as defined in claim 14, wherein said unsegmented gears on said output shafts are positioned adjacent said steering member and said segmented gears on said output shafts are spaced from said steering member by unsegmented gears, and wherein said crab steering gear means includes a crown gear fixed to said steering member to mesh with said unsegmented gears when said cam is turned to a predetermined position.

16. The invention as defined in claim 14, wherein an additional gear is provided on each of said auxiliary shafts to mesh with each of said unsegmented gears on said output shafts, each pair of gears on each auxiliary shaft being spaced apart a distance sufficient to clear the unmeshed one of said segmented and unsegmented gears on a corresponding one of said output shafts.

17. A dirigible dolly comprising: a framework; first and second pairs of wheel means to support said framework, each of said first pair of wheel means being rotatable about a separate corresponding horizontal and vertical axis; a steering member having a center position; a transmission responsive to movement of said steering member for turning said first pair of wheel means about their respective vertical axes, all of said wheel means being in a parallel position when said steering member is moved to its center position, both said first and second pairs of wheel means having common horizontal parallel axes when maintained in said parallel position; and means for maintaining said second pair of wheel means in said parallel position while said first pair of wheel means are turned, said transmission including means to rotate both said first pair of wheel means in one direction about their respective vertical axes simultaneously in response to movement of said steering member in a first direction, the rate of movement of one of said first pair of wheel means with respect to the other being a constant G less than unit when said steering member is moved in said first direction, said transmission also including means to rotate both said first pair of wheel means in a direction opposite said one direction in response to movement of said steering member in a second direction opposite said first direction, the rate of movement of said one of said first pair of wheel means with respect to said other of said first pair of wheel means being a constant equal to $1/G$ when said steering member is moved in said second direction, said transmission including a first pair of auxiliary shafts, means to rotate said auxiliary shafts substantially at the same rate in response to movement of said steering member, first and second gears of different diameters fixed to each of said auxiliary shaft, a pair of output shafts, third and fourth gears on each of said output shafts to mesh selectively with one of said first and second pairs of gears, said third and fourth gears being respectively spaced apart on corresponding output shafts a distance at least sufficiently large to clear both corresponding first and second gears individually.

18. The invention as defined in claim 17, wherein said output shafts are connected together and are indirectly connected to said first pair of wheel means via splined connections, and wherein the following are additionally provided: means to center said output shaft to cause said transmission to operate said wheel means via a crab connection and means to shift said output shafts axially from one extreme position to the other automatically when said steering member is moved past its center position to mesh one of said first and third pairs of gears.

19. A dirigible dolly comprising: a framework; first and second pairs of vertical shafts rotatably mounted on said framework positioned at four corners of a rectangle; first and second pairs of wheel means having axes extending horizontally through said vertical shafts respectively in the same horizontal plane; a steering member having a center position, all of said wheel means being parallel and the horizontal axes in each of said pairs being common when said steering member is moved to its center position; first and second pairs of horizontal transmission shafts rotatably mounted in end relation from said second pair of vertical shafts to said first pair of vertical shafts, respectively; lock means operable to hold said second pair of transmission shafts in a fixed position selectively relative either to said framework or to said first pair of transmission shafts, said second pair of wheel means having common horizontal axes when said second pair of transmission shafts are held in a fixed position relative to said framework; a steering transmission between said first pair of vertical shafts and having said steering member connected thereto; a third pair of transmission shafts extending from corresponding ones of said first pair of vertical shafts to said steering transmission; and gear means on said vertical shafts and on the ends of all of said transmission shafts adjacent said vertical shafts and said steering transmission to turn all of said shafts in response to movement of said steering member, said locking means comprising: first and second cylindrical bodies maintained in fixed angular positions on and at the mutually adjacent ends of said first and second pairs of transmission shafts respectively, said second cylindrical bodies also being maintained in fixed axial positions on said second pairs of transmission shafts, said first cylindrical bodies being maintained in a movable axial position on said first pair of transmission shafts toward and away from said second pair of cylindrical bodies, respectively; first locking means on said first cylindrical body for cooperation with second locking means on said framework to prevent rotation of said first pair of cylindrical bodies relative to said first pair of transmission shafts, respectively, when said first and second pairs of cylindrical bodies are spaced apart; lock shift means to move said first pair of cylindrical bodies axially on said first pair of transmission shafts, said lock shift means being adapted to permit rotation of said first cylindrical bodies about the axis of said first pair of transmission shafts.

20. The invention as defined in claim 19, wherein said transmission includes gear shift means to shift from a round to a crab position and vice versa, one of said third pair of transmission shafts turning at a constant rate G when said gear shift means is in said round position and said steering member is turned in a first direction from said center position, said one of said third pair of transmission shafts being turned at a constant rate $1/G$ when said gear shift means is in said round position and said steering member is turned in a second direction from said center position opposite said first direction, and wherein means are additionally provided to operate said lock shift means and said gear shift means simultaneously.

21. A dirigible dolly comprising: a framework; first and second pairs of vertical shafts rotatably mounted on said framework positioned at four corners of a rectangle; first and second pairs of wheel means having axes extending horizontally through said vertical shafts respectively in the same horizontal plane; a steering member having a center position, all of said wheel means being parallel and the horizontal axes in each of said pairs being common when said steering member is moved to its center position; first and second pairs of horizontal transmission shafts rotatably mounted in end relation from said second pair of vertical shafts to said first pair of vertical shafts, respectively; lock means operable to hold said second pair of transmission shafts in a fixed position selectively relative either to said framework or to said first pair of transmission shafts, said second pair of wheel means having common horizontal axes when said second pair of transmission shafts are held in a fixed position relative to said framework; a steering transmission between said first pair of vertical shafts and having said steering member connected thereto; a third pair of transmission shafts extending from corresponding ones of said first pair of vertical shafts to said steering transmission; and gear means on said vertical shafts and on the ends of all of said transmission shafts adjacent said vertical shafts and said steering transmission to turn all of said shafts in response to movement of said steering member, said gear means including a first pair of bevel-gears fixed to the ends of said second pair of transmission shafts respectively adjacent said second pair of vertical shafts, a second pair of bevel-gears fixed to the ends of said first pair of transmission shafts adjacent said first pair of vertical shafts, a third pair of bevel-gears fixed to the ends of said third pair of transmission shafts adjacent said first pair of vertical shafts, a fourth pair of bevel-gears on said first pair of vertical shafts to mesh with said second and third pair of bevel-gears, respectively, and a fifth pair of bevel-gears on said second pair of vertical shafts to mesh with said first pair of bevel-gears respectively, one of said fourth and fifth pairs of bevel-gears being located below the axes of said first and second pairs of transmission shafts and the other of said fourth and fifth pairs of bevel-gears being located above the axis of said first and second pairs of transmission shafts, both of said third pairs of transmission shafts also being connected to said steering member solely by intermediate gears.

22. The invention as defined in claim 21, wherein said intermediate gears include at least a main bevel-gear on said steering member and two oppositely positioned auxiliary bevel-gears to mesh with said main bevel-gear for driving connection with said third pair of transmission shafts, and wherein the following are additionally provided: manually operable means to rotate said steering member and a driving connection between said manually operable means and said steering member, the vertical position of said fourth and fifth pairs of bevel-gears on said vertical shafts being appropriate to cause said wheel means to turn in the same direction as said manually operable means.

23. A dirigible dolly comprising: a framework; first and second pairs of wheel means to support said framework, each of said first pair of wheel means being rotatable about separate corresponding horizontal and vertical axes, a steering member having a center position; a transmission responsive to movement of said steering member for turning said first pair of wheel means about their respective vertical axes, all of said wheel means being in a parallel position when said steering member is moved to its center position, both said first and second pairs of wheel means having common horizontal parallel axes when maintained in said parallel position; and means for maintaining said second pair of wheel means in said parallel position while said first pair of wheel means are turned, said transmission including means to rotate both said first pair of wheel means in one direction about their respective vertical axes simultaneously in response to movement of said steering member in a first direction, the rate of movement of one of said first pair of wheel means with respect to the other being a constant G less than unity when said steering member is moved in said first direction, said transmission also including means to rotate both said first pair of wheel means in a direction opposite said one direction in response to movement of said steering member in a second direction opposite said first direction, the rate of movement of said one of said first pair of wheel means with respect to said other of said first pair of wheel means being a constant equal to $1/G$ when said steering member is moved in said second direction; said transmission also including a first pair of segmented gears to mesh respectively with a second pair of segmented gears, means for maintaining said segmented gears in a fixed axial but rotatable angular position, first and second pairs of auxiliary shafts oppositely extending from and fixed to said first and second pairs of segmented gears respectively and having first and second pairs of bevel-gears fixed to the ends thereof, respectively, a steering member extending between mutually adjacent ends of said second pair of auxiliary shafts, said steering member having a bevel-gear fixed thereto and each of said second pair of auxiliary shafts having a bevel-gear fixed thereto to mesh with the bevel-gear on said steering member, a pair of output shafts, and gear shift means including shafts geared to said output shafts and having additional gears to mesh selectively with said first and said second pairs of bevel-gears.

24. The invention as defined in claim 23, wherein said gear shift means comprises: a third pair of auxiliary shafts each having a third bevel-gear to mesh with said second pair of bevel-gears, and a fourth bevel-gear to mesh with said first pair of bevel-gears, said third and fourth bevel-gears being mounted in both fixed axial and fixed angular positions relative to said third pair of auxiliary shafts, each of said output shafts having a bevel-gear to mesh with a fifth bevel-gear on each of said third pair of auxiliary shafts, said fifth bevel-gears being mounted in a fixed angular but movably axial positions on said third pair of shafts, said third pair of auxiliary shafts being axially movable to mesh one of said third and fourth pairs of bevel-gears with a corresponding one of said first and second pairs of bevel-gears selectively.

25. The invention as defined in claim 24, wherein manually operable means are provided to shift the axial positions of said third pair of auxiliary shafts simultaneously.

26. The invention as defined in claim 25, wherein said manually operable means also includes means to lock said second pair of wheel means in said parallel position.

References Cited in the file of this patent

UNITED STATES PATENTS

| | | |
|---|---|---|
| 1,289,296 | Stebbins et al. | Dec. 31, 1918 |
| 2,470,496 | Krilanovich | May 17, 1949 |
| 2,715,534 | Hoge et al. | Aug. 16, 1955 |
| 2,731,277 | Pearne | Jan. 17, 1956 |
| 2,834,605 | McCollough | May 13, 1958 |
| 2,842,376 | Krilanovich | Aug. 13, 1958 |

FOREIGN PATENTS

| | | |
|---|---|---|
| 764,844 | France | Mar. 12, 1934 |
| 451,813 | Great Britain | Aug. 12, 1936 |
| 265,078 | Switzerland | Feb. 16, 1950 |

UNITED STATES PATENT OFFICE
CERTIFICATE OF CORRECTION

Patent No. 2,915,319                                            December 1, 1959

William L. Kumler et al.

It is hereby certified that error appears in the printed specification of the above numbered patent requiring correction and that the said Letters Patent should read as corrected below.

Column 8, line 19, for "$E_p$" read -- $F_p$ --; column 21, line 44, for "unit" read -- unity --.

Signed and sealed this 24th day of May 1960.

(SEAL)
Attest:

KARL H. AXLINE                                              ROBERT C. WATSON
Attesting Officer                                            Commissioner of Patents